United States Patent
Champa et al.

(10) Patent No.: US 12,162,536 B2
(45) Date of Patent: Dec. 10, 2024

(54) LOAD CARRIER SUPPORT ASSEMBLY FOR VEHICLE BED FRAME

(71) Applicant: Thule Sweden AB, Hillerstorp (SE)

(72) Inventors: Calvin Champa, Middletown, CT (US); Joseph Settelmayer, McKinleyville, CA (US)

(73) Assignee: Thule Sweden AB, Hillerstorp (SE)

( * ) Notice: Subject to any disclaimer, the term of this patent is extended or adjusted under 35 U.S.C. 154(b) by 195 days.

(21) Appl. No.: 17/548,113

(22) Filed: Dec. 10, 2021

(65) Prior Publication Data
US 2022/0185394 A1 Jun. 16, 2022

Related U.S. Application Data

(60) Provisional application No. 63/124,398, filed on Dec. 11, 2020.

(51) Int. Cl.
| | |
|---|---|
| *B62D 33/02* | (2006.01) |
| *B60R 9/06* | (2006.01) |
| *F16B 2/06* | (2006.01) |

(52) U.S. Cl.
CPC ............ *B62D 33/0207* (2013.01); *B60R 9/06* (2013.01); *F16B 2/06* (2013.01)

(58) Field of Classification Search
CPC ..... B60R 9/06; F16B 2/12; B25B 5/00; B25B 5/02; B25B 5/067; B25B 5/082; B25B 5/101; B25B 5/125
USPC ............... 224/403–405; 248/229.14, 229.24, 248/229.12, 229.22, 228.3, 230.3, 231.41, 248/316.4
See application file for complete search history.

(56) References Cited

U.S. PATENT DOCUMENTS

| | | | | | |
|---|---|---|---|---|---|
| 733,031 | A | * | 7/1903 | Fell | A01B 63/023 |
| | | | | | 172/198 |
| 783,031 | A | * | 2/1905 | Fell | B25B 5/006 |
| | | | | | 269/45 |
| 812,699 | A | * | 2/1906 | Stevens | B25B 5/101 |
| | | | | | 269/98 |

(Continued)

OTHER PUBLICATIONS

Yakima BedRock HD Instruction Manual, download from http://assets.yakima.com/product/instructions/8001160/1 on Oct. 27, 2020 (8 pages).

(Continued)

*Primary Examiner* — Scott T McNurlen
(74) *Attorney, Agent, or Firm* — Sterne, Kessler, Goldstein & Fox P.L.L.C.

(57) ABSTRACT

A support assembly for securing a load carrier to a bed structure of a vehicle includes a clamp assembly and a tensioning device. The clamp assembly for clamping the load carrier to the bed structure of the vehicle includes a first jaw member and a second jaw member opposite the first jaw member. The second jaw member includes a first hook member and a second hook member opposite the first hook member. The first hook member has a first concave portion facing towards the first jaw member. The second hook member has a second concave portion facing away from the first jaw member. The clamp assembly is attachable to a plurality of different vehicle bed structures. The tensioning device is coupled to the clamp assembly and is configured to tighten the clamp assembly.

27 Claims, 24 Drawing Sheets

(56) References Cited

U.S. PATENT DOCUMENTS

| | | | | |
|---|---|---|---|---|
| 5,228,739 | A * | 7/1993 | Love | F16B 2/065 |
| | | | | 296/35.3 |
| 5,301,913 | A * | 4/1994 | Wheatley | B62D 35/001 |
| | | | | 248/231.41 |
| 5,975,618 | A | 11/1999 | Rippberger | |
| 6,059,159 | A * | 5/2000 | Fisher | B60R 9/00 |
| | | | | 224/403 |
| 6,547,311 | B1 | 4/2003 | Derecktor | |
| 7,296,837 | B2 * | 11/2007 | Niedziela | B60R 11/00 |
| | | | | 296/3 |
| 7,753,425 | B2 | 7/2010 | Niedziela et al. | |
| 8,523,128 | B2 | 9/2013 | Palermo | |
| 8,668,125 | B2 | 3/2014 | Williams | |
| 9,248,784 | B2 | 2/2016 | Kraeuter et al. | |
| 9,725,046 | B2 | 8/2017 | Perry | |
| 9,834,258 | B2 | 12/2017 | Marr, Jr. | |
| 9,975,494 | B2 * | 5/2018 | Connors | B60R 9/08 |
| 10,746,209 | B2 * | 8/2020 | Voegele | B60J 7/198 |
| 11,072,376 | B2 * | 7/2021 | Condon | B62D 33/0207 |
| 2007/0296133 | A1 * | 12/2007 | McClure | F22B 37/201 |
| | | | | 269/241 |
| 2008/0101883 | A1 * | 5/2008 | Derecktor | B60P 7/0815 |
| | | | | 248/220.21 |
| 2019/0367100 | A1 | 12/2019 | Condon et al. | |
| 2019/0367101 | A1 | 12/2019 | McFadden et al. | |

OTHER PUBLICATIONS

Thule TracRac Pro2 User Manual, download from https://www.thule.com/-/s/approved/std.lang.all/40/39/594039.pdf on Oct. 27, 2020 (11 pages).

Thule Xsporter Pro User Manual, download from https://www.thule.com/-/s/approved/std.lang.all/53/49/455349.pdf on Oct. 27, 2020 (16 pages).

* cited by examiner

LOAD CARRIER SUPPORT ASSEMBLY FOR VEHICLE BED FRAME

CROSS REFERENCE TO RELATED APPLICATION

This application claims priority to U.S. Provisional Application No. 63/124,398, filed Dec. 11, 2020, which is hereby incorporated herein in its entirety by reference.

BACKGROUND

Field

The present disclosure relates to load carriers for vehicles having bed structures. More specifically, aspects of the present disclosure relate to a support assembly system and apparatus for securing a load carrier to a bed structure of a vehicle.

Background

Load carriers can be attached to a vehicle to transport various objects (e.g., bikes, kayaks, construction equipment, etc.). A load carrier can be secured to a bed structure of a vehicle by a support assembly. However, current support assemblies are incompatible with certain types of bed structures, for example, new pickup trucks. Accordingly, a support assembly that can attach to a plurality of different vehicle bed structures is needed to provide better compatibility, versatility, and universality.

BRIEF SUMMARY

In some aspects, a support assembly for securing a load carrier to a bed structure of a vehicle includes a clamp assembly and a tensioning device. In some aspects, the clamp assembly is for clamping the load carrier to the bed structure of the vehicle. In some aspects, the clamp assembly includes a first jaw member and a second jaw member opposite the first jaw member. In some aspects, the second jaw member includes a first hook member and a second hook member opposite the first hook member. In some aspects, the first hook member has a first concave portion facing towards the first jaw member. In some aspects, the second hook member has a second concave portion facing away from the first jaw member. In some aspects, the clamp assembly is attachable to a plurality of different vehicle bed structures. In some aspects, the tensioning device is coupled to the clamp assembly and is configured to tighten the clamp assembly.

In some aspects, the second jaw member is monolithic.

In some aspects, the first and second hook members are interchangeably connected to the tensioning device such that the first hook member can be disposed between the first jaw member and the second hook member in a first configuration, and the second hook member can be disposed between the first jaw member and the first hook member in a second configuration.

In some aspects, the first concave portion comprises a U-shape.

In some aspects, the first hook member includes a first hook leg configured to couple to the tensioning device. In some aspects, the first hook member includes a second hook leg spaced laterally from the first hook leg and configured to couple to the bed structure of the vehicle in a locked configuration. In some aspects, the first hook member includes a bevel configured to accommodate the plurality of different vehicle bed structures and configured to decrease a distance between the second jaw member and the bed structure in a locked configuration.

In some aspects, the second concave portion comprises a U-shape.

In some aspects, the second hook member includes a first hook leg configured to couple to the tensioning device. In some aspects, the second hook member includes a second hook leg spaced laterally from the first hook leg and configured to couple to the bed structure of the vehicle in a locked configuration. In some aspects, the second hook member includes a bevel configured to accommodate the plurality of different vehicle bed structures and configured to decrease a distance between the second jaw member and the bed structure in a locked configuration.

In some aspects, the first and second hook members are separated from each other along a transverse edge.

In some aspects, a jaw member for a clamp assembly for clamping a load carrier to a bed structure of a vehicle includes a first hook member, a second hook member opposite the first hook member, and a gap disposed between the first and second hook members. In some aspects, the gap is at least about 19.5 mm. In some aspects, the jaw member is attachable to a plurality of different vehicle bed structures.

In some aspects, the first and second hook members are interchangeable with one another such that the first hook member can be disposed above the second hook member in a first configuration, and the second hook member can be disposed above the first hook member in a second configuration.

In some aspects, the first hook member includes a first hook leg having a through hole for a tensioning device. In some aspects, the first hook member includes a second hook leg spaced laterally from the first hook leg and configured to couple to the bed structure of the vehicle in a locked configuration. In some aspects, the second hook leg comprises a distal contact surface having a surface area of at least about 270 $mm^2$ to distribute a force between the first hook member and the bed structure along the distal contact surface in the locked configuration. In some aspects, the first and second hook legs are spaced laterally from each other by an interior distance of about 19 mm. In some aspects, the first hook member includes a bevel at an angle of at least about 13 degrees.

In some aspects, the second hook member includes a first hook leg having a through hole for a tensioning device. In some aspects, the second hook member includes a second hook leg spaced laterally from the first hook leg and configured to couple to the bed structure of the vehicle in a locked configuration. In some aspects, the second hook leg includes a distal contact surface having a surface area of at least about 360 $mm^2$ to distribute a force between the second hook member and the bed structure along the distal contact surface in the locked configuration.

In some aspects, a length of the second hook member along a longitudinal axis of the jaw member is greater than a length of the first hook member along the longitudinal axis.

In some aspects, a system for securing a load carrier to a bed structure of a vehicle includes a load carrier foot and a support assembly. In some aspects, the support assembly is for securing the load carrier foot to the bed structure of the vehicle. In some aspects, the support assembly includes a clamp assembly for clamping the load carrier to the bed structure of the vehicle and a tensioning device coupled to the clamp assembly and configured to tighten the clamp assembly. In some aspects, the clamp assembly includes a first jaw member and a second jaw member opposite the first jaw member. In some aspects, the second jaw member includes a first hook member having a first concave portion facing towards the first jaw member and a second hook member opposite the first hook member and having a second concave portion facing away from the first jaw member. In some aspects, the clamp assembly is attachable to a plurality of different vehicle bed structures.

In some aspects, a system for securing a load carrier to a bed structure of a vehicle can include a load carrier foot and a support assembly coupled to the load carrier foot. In some aspects, the support assembly can include a clamp assembly, a first tensioning device, and a second tensioning device. In some aspects, the clamp assembly can include a first jaw member and a second jaw member opposite the first jaw member. In some aspects, the clamp assembly can be attachable to a plurality of different vehicle bed structures. In some aspects, the first tensioning device can be coupled to the clamp assembly. In some aspects, the first tensioning device can be configured to tighten the clamp assembly. In some aspects, the second tensioning device can be coupled to the clamp assembly. In some aspects, the second tensioning device can be configured to secure the load carrier foot to the clamp assembly.

In some aspects, the second jaw member can include a first hook member and a second hook member. In some aspects, the first hook member can have a first concave portion facing towards the first jaw member. In some aspects, the second hook member can be opposite the first hook member. In some aspects, the second hook member can have a second concave portion facing away from the first jaw member.

In some aspects, the first jaw member can include a pad configured to contact the bed structure of the vehicle. In some aspects, the pad can include a thermoplastic elastomer (TPE). In some aspects, the pad can include thermoplastic polyurethane (TPU). In some aspects, the pad can include an exterior surface that is substantially flat. In some aspects, the pad can include an aperture for the second tensioning device.

In some aspects, the first jaw member can include an L-shape. In some aspects, the first jaw member can include an aperture for the second tensioning device.

Implementations of any of the techniques described above may include a system, a method, a process, a device, and/or an apparatus. The details of one or more implementations are set forth in the accompanying drawings and the description below. Other features will be apparent from the description and drawings, and from the claims.

Further features and advantages of the invention, as well as the structure and operation of various aspects of the invention, are described in detail below with reference to the accompanying drawings. It is noted that the invention is not limited to the specific aspects described herein. Such aspects are presented herein for illustrative purposes only. Additional aspects will be apparent to persons skilled in the relevant art(s) based on the teachings contained herein.

BRIEF DESCRIPTION OF THE DRAWINGS

The accompanying drawings, which are incorporated herein and form a part of the specification, illustrate the aspects and, together with the description, further serve to explain the principles and to enable a person skilled in the relevant art(s) to make and use the aspects. Objects and advantages of illustrative, non-limiting aspects will become more apparent by describing them in detail with reference to the attached drawings.

Figure 1:
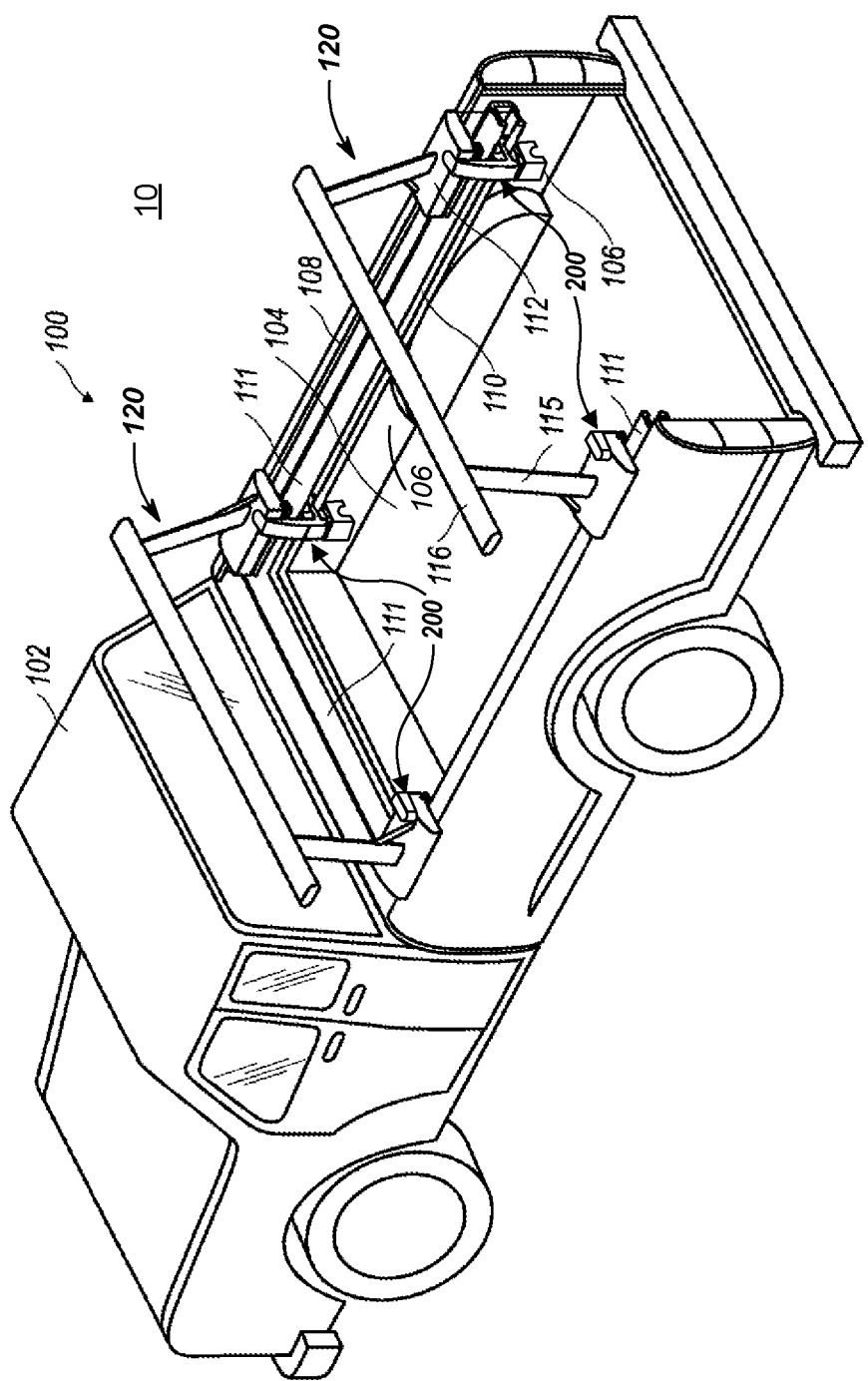
FIG. 1 illustrates a perspective view of a load carrier system, according to an aspect.

The features and advantages of the aspects will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Aspects of the present disclosure are described in detail with reference to aspects thereof as illustrated in the accompanying drawings. References to "one aspect," "an aspect," "some aspects," etc., indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

Spatially relative terms, such as "beneath," "below," "lower," "above," "on," "upper," "opposite" and the like, may be used herein for ease of description to describe one element or feature's relationship to another element(s) or feature(s) as illustrated in the figures. The spatially relative terms are intended to encompass different orientations of the device in use or in operation in addition to the orientation depicted in the figures. The apparatus may be otherwise oriented (e.g., rotated 90 degrees or at other orientations) and the spatially relative descriptors used herein may likewise be interpreted accordingly.

The term "about" as used herein indicates the value of a given quantity that can vary based on a particular technology. Based on the particular technology, the term "about" can indicate a value of a given quantity that varies within, for example, 1-15% of the value (e.g., ±1%, ±2%, ±5%, ±10%, or ±15% of the value).

The following examples are illustrative, but not limiting, of the present aspects. Other suitable modifications and adaptations of the variety of conditions and parameters normally encountered in the field, and which would be apparent to those skilled in the art, are within the spirit and scope of the disclosure.

As discussed above, load carriers can be attached to a vehicle to transport various objects, for example, elongate objects (e.g., ladders, lumber, piping, canoes, kayaks, paddles, surfboards, etc.). A load carrier can be secured to a bed structure (e.g., rails, tracks, etc.) of a vehicle by a support assembly, for example, a clamp assembly and a tensioning device. However, support assemblies (e.g., clamp assemblies) can be incompatible with certain types of bed structures, for example, new pickup trucks (e.g., Chevrolet® Silverado, Chevrolet® Colorado, Dodge RAM® 1500/2500/3500, Ford® F-Series, GMC® Sierra, GMC® Canyon, Jeep® Gladiator, Nissan® Frontier, Nissan® Titan, Toyota® Tacoma, Toyota® Tundra, etc.). Therefore, there is a need to provide a support assembly with better compatibility, versatility, and universality. This allows the support assembly to attach to a plurality of different vehicle bed structures and secure a load carrier to multiple vehicles.

Aspects of support assembly apparatuses, systems, and methods as discussed below can provide better compatibility, versatility, and universality than current assemblies and can be attached to a plurality of different vehicle bed structures to secure load carriers to multiple vehicles (e.g., Chevrolet® Silverado, Chevrolet® Colorado, Dodge RAM® 1500/2500/3500, Ford® F-Series, GMC® Sierra, GMC® Canyon, Jeep® Gladiator, Nissan® Frontier, Nissan® Titan, Toyota® Tacoma, Toyota® Tundra, etc.).

Example Load Carrier System

FIG. 1 illustrates load carrier system 100, according to aspects. FIG. 1 illustrates a perspective view of load carrier system 100 for vehicle 102. Load carrier system 100 can be configured to secure load carrier 120 to vehicle bed structure 104 of vehicle 102. Although load carrier system 100 is shown in FIG. 1 as an apparatus and/or system for vehicle 102, the aspects of this disclosure can be used with other apparatuses and/or systems, such as, but not limited to one or more load carriers 120, support assembly 200, 200', 200", 200''', and/or other vehicles. In some aspects, load carrier system 100 can be implemented on different vehicles 102. For example, vehicle 102 can include Chevrolet® Silverado, Chevrolet® Colorado, Dodge RAM® 1500/2500/3500, Ford® F-Series, GMC® Sierra, GMC® Canyon, Jeep® Gladiator, Nissan® Frontier, Nissan® Titan, Toyota® Tacoma, Toyota® Tundra, and/or other pickup trucks.

As shown in FIG. 1, load carrier system 100 can include load carrier 120 and support assembly 200. In some aspects, load carrier 120 can be secured to vehicle bed structure 104 of vehicle 102 by support assembly 200. For example, as shown in FIG. 1, one or more support assemblies 200 can be secured to interior rails 110, 111 of vehicle bed structure 104 and be secured to one or more load carrier feet 112 of load carrier 120.

Vehicle 102 can include vehicle bed structure 104. Vehicle bed structure 104 can include sidewalls 106, exterior rails 108, and/or interior rails 110, 111. In some aspects, support assembly 200 can be coupled to sidewalls 106, exterior rails 108, and/or interior rails 110, 111. For example, as shown in FIG. 1, support assembly 200 can be coupled to sidewalls 106, interior rails 110, 111, and load carrier 120.

Load carrier 120 can be configured to attach to vehicle 102 to transport various objects, for example, elongate objects (e.g., ladders, lumber, piping, canoes, kayaks, paddles, surfboards, etc.). Load carrier 120 can include load carrier foot 112, load carrier upright 115, and/or load carrier cross bar 116. In some aspects, load carrier 120 can include dual load carrier feet 112 and/or dual load carrier uprights 115. For example, as shown in FIG. 1, load carrier foot 112 can be coupled to load carrier upright 115 and distal ends of load carrier uprights 115 can be coupled to distal ends of load carrier cross bar 116. In some aspects, load carrier system 100 can include one or more load carriers 120. For example, as shown in FIG. 1, load carrier system 100 can include dual load carriers 120.

Figure 2:
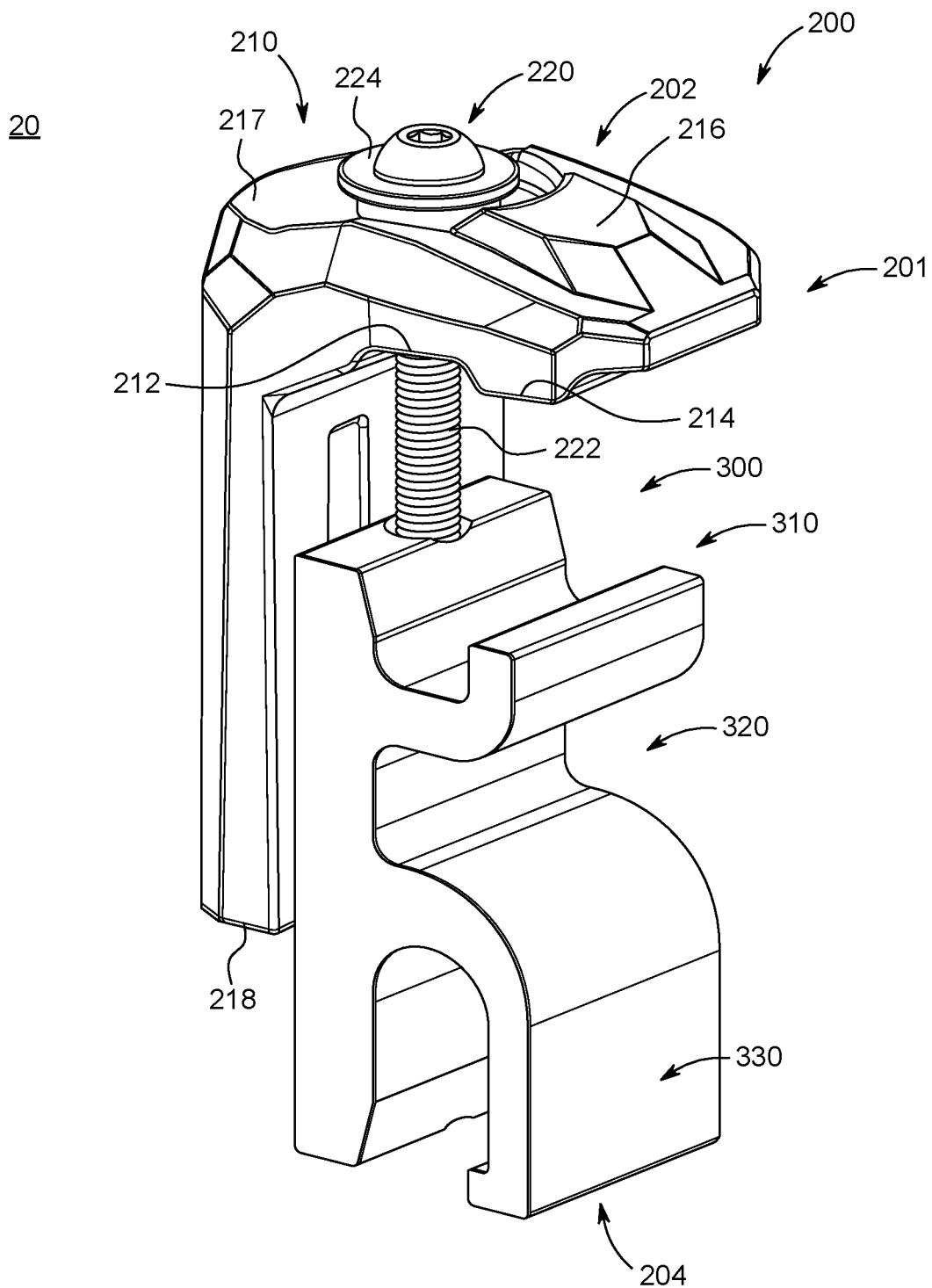
FIG. 2 illustrates a front perspective view of a support assembly in a first configuration, according to an aspect.
Figure 3:
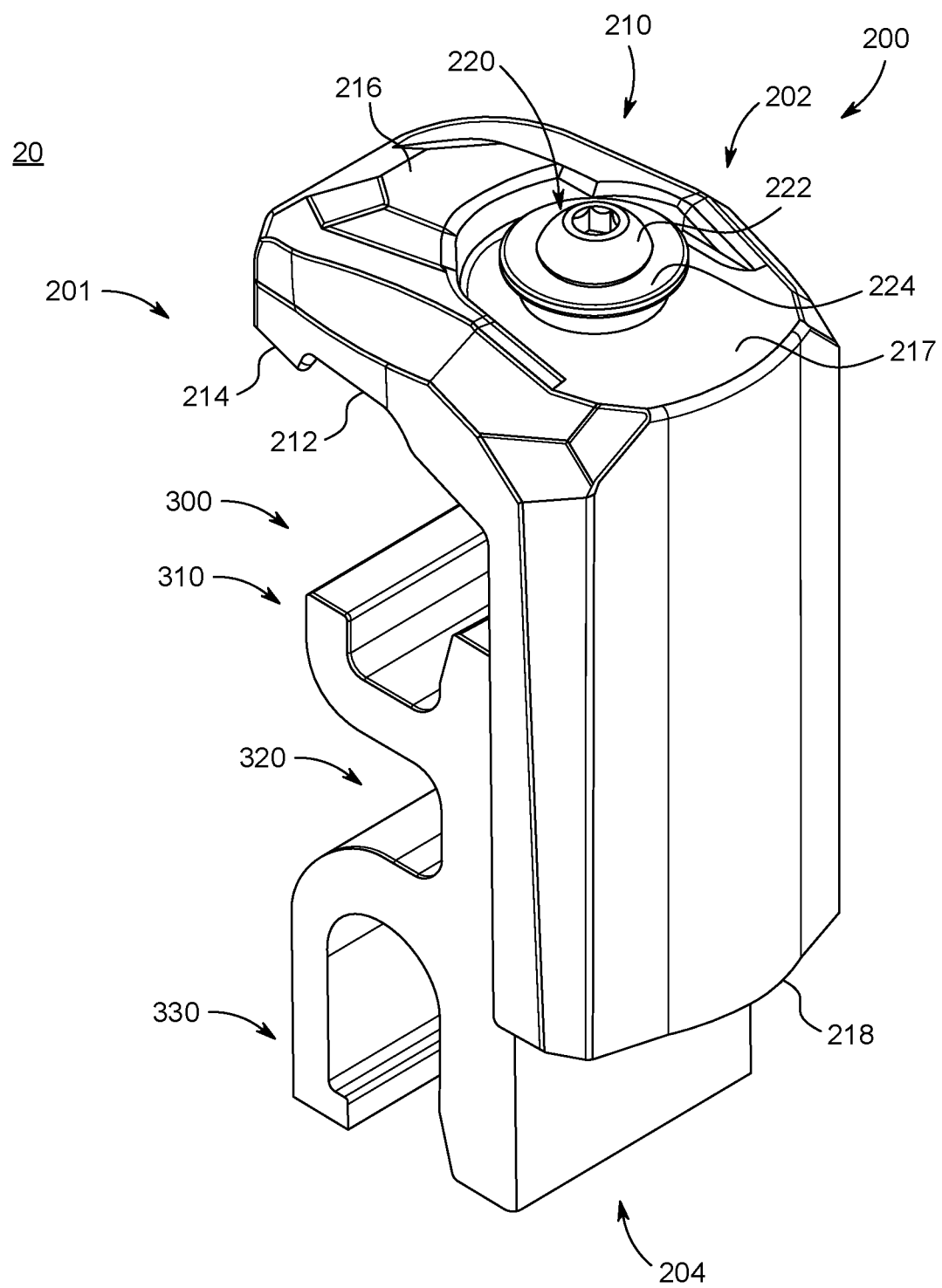
FIG. 3 illustrates a rear perspective view of the support assembly shown in FIG. 2.
Figure 4:
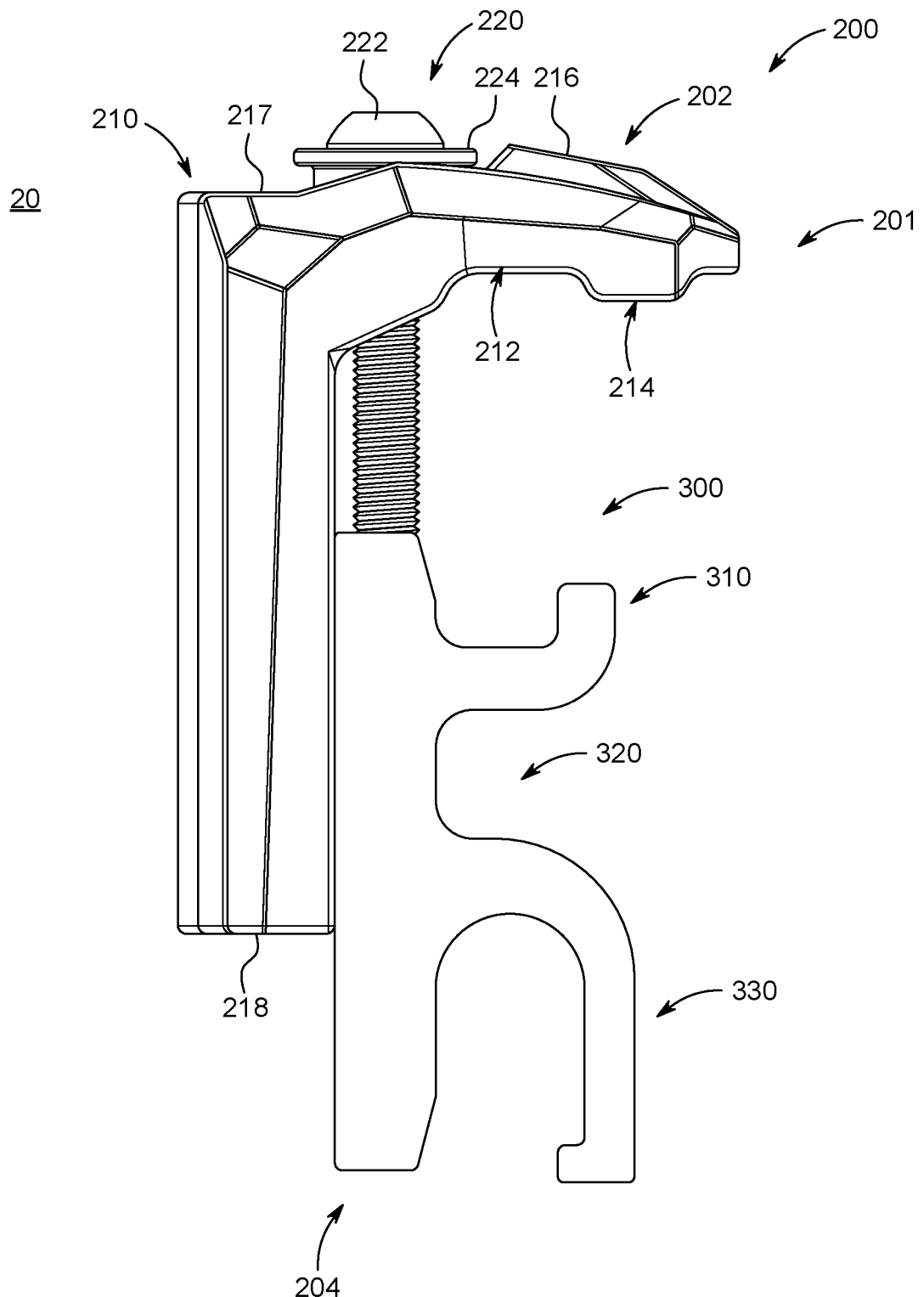
FIG. 4 illustrates a side view of the support assembly shown in FIGS. 2 and 3.

Support assembly 200 can be configured to secure load carrier 120 to vehicle bed structure 104 of vehicle 102. In some aspects, support assembly 200 can include first jaw member 210, second jaw member 300, and tensioning device 220. For example, as shown in FIGS. 2-4, first jaw member 210 and second jaw member 300 can form clamp assembly 201 for clamping load carrier 120 to vehicle bed structure 104 of vehicle 102. Tensioning device 220 can be coupled to first and second jaw members 210, 300 (e.g., clamp assembly 201) and can be configured to tighten first and second jaw members 210, 300 (e.g., clamp assembly 201) to secure support assembly 200 onto vehicle bed structure 104.

In some aspects, support assembly 200 can secure load carrier 120 to vehicle bed structure 104 in a locked configuration (e.g., locked configuration 10). For example, as shown in FIG. 1, support assembly 200 can be in locked configuration 10 such that tensioning device 220 tightens and secures first jaw member 210 to load carrier foot 112 of load carrier 120 and tightens and secures second jaw member 300 to vehicle bed structure 104 of vehicle 102.

Example Support Assembly

Figure 5:
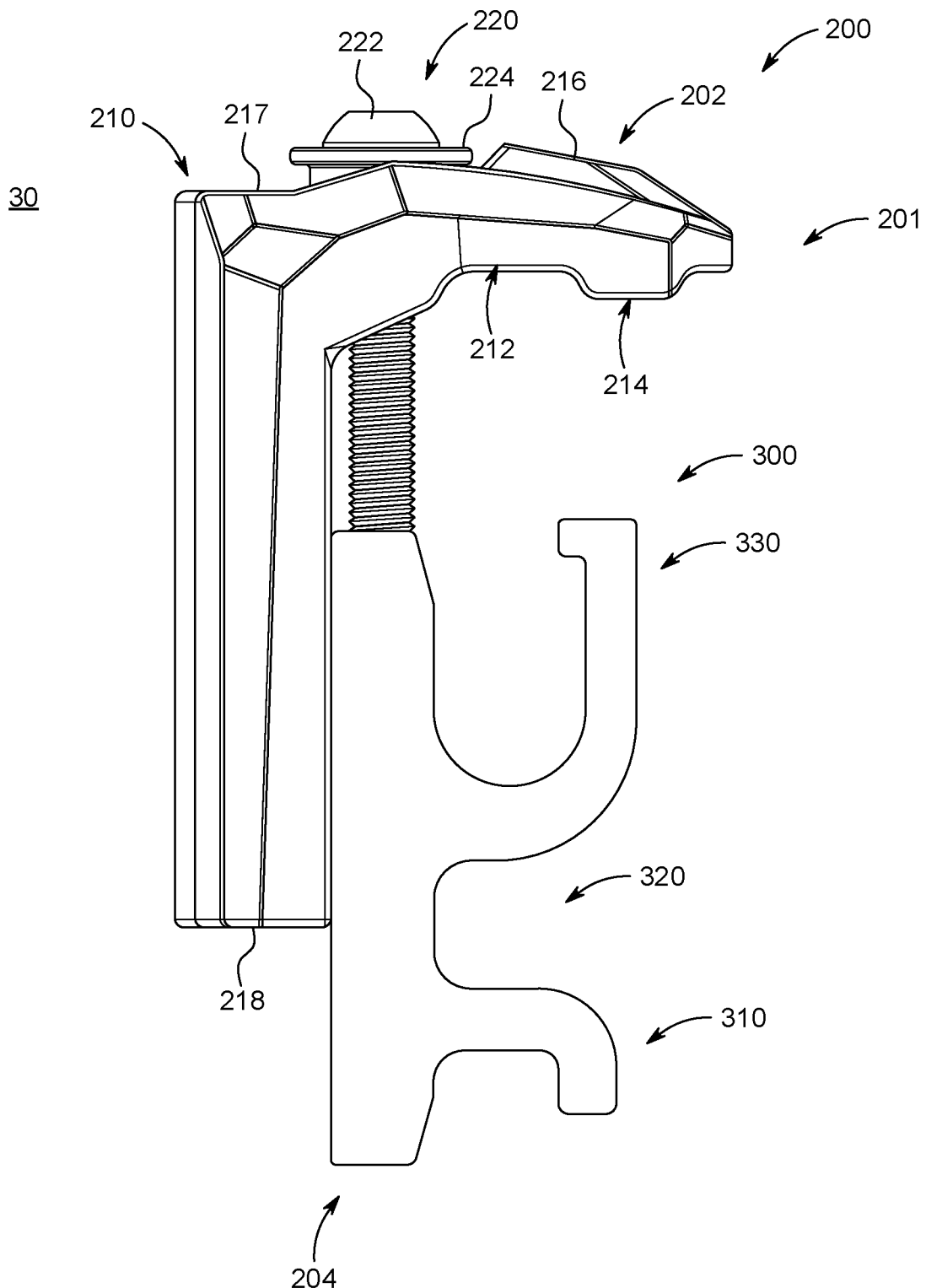
FIG. 5 illustrates a side view of the support assembly shown in FIGS. 2-4 in a second configuration, according to an aspect.

FIGS. 2-5 illustrate support assembly 200, according to aspects. FIG. 2 illustrates a front perspective view of support assembly 200 in first configuration 20. FIG. 3 illustrates a rear perspective view of support assembly 200 shown in FIG. 2. FIG. 4 illustrates a side view of support assembly 200 shown in FIGS. 2 and 3. FIG. 5 illustrates a side view of support assembly 200 shown in FIGS. 2-4 in second configuration 30. Support assembly 200 can be configured to secure load carrier 120 to vehicle bed structure 104 of vehicle 102. Although support assembly 200 is shown in FIGS. 2-5 as a stand-alone apparatus and/or system, the aspects of this disclosure can be used with other apparatuses and/or systems, such as, but not limited to load carrier system 100, load carrier 120, support assembly 200', 200", 200''', first jaw member 210, tensioning device 220, second jaw member 300, extension piece 400, lock assembly 500, and/or other vehicles. In some aspects, support assembly 200 can be part of load carrier system 100. In some aspects, support assembly 200 can be implemented on different vehicles 102. For example, vehicle 102 can include Chevrolet® Silverado, Chevrolet® Colorado, Dodge RAM® 1500/2500/3500, Ford® F-Series, GMC® Sierra, GMC® Canyon, Jeep® Gladiator, Nissan® Frontier, Nissan® Titan, Toyota® Tacoma, Toyota® Tundra, and/or other similar pickup trucks.

As shown in FIGS. 2-5, support assembly 200 can include frontside 202, backside 204, first jaw member 210, tensioning device 220, and second jaw member 300. In some aspects, support assembly 200 can include clamp assembly 201 for clamping load carrier 120 to vehicle bed structure 104. For example, clamp assembly 201 can include first jaw member 210 and second jaw member 300, forming upper and lower jaws of clamp assembly 201, respectively. In some aspects, clamp assembly 201 (e.g., first and second jaw members 210, 300) is attachable to a plurality of different vehicle bed structures 104. For example, vehicle bed structure 104 can include Chevrolet® Silverado, Chevrolet® Colorado, Dodge RAM® 1500/2500/3500, Ford® F-Series, GMC® Sierra, GMC® Canyon, Jeep® Gladiator, Nissan® Frontier, Nissan® Titan, Toyota® Tacoma, Toyota® Tundra, and/or other pickup truck bed structures.

First jaw member 210 can be configured to secure load carrier 120 to support assembly 200. For example, first jaw member 210 can contact load carrier foot 112 of load carrier 120 and apply a downward force (e.g., via tensioning device 220) to clamp load carrier foot 112 to vehicle bed structure 104. In some aspects, first jaw member 210 can include a polymer, a metal, a ceramic, some combination thereof, and/or any other suitably rigid material. For example, first jaw member 210 can include extruded aluminum.

First jaw member 210 can include notch 212, contact surface 214, frontside 216, and backside 218. Notch 212 can be configured to receive a portion of load carrier 120, for example, load carrier foot 112 in locked configuration 10. Contact surface 214 can be configured to contact a portion of load carrier 120, for example, load carrier foot 112 in locked configuration 10. In some aspects, frontside 216 can include recessed and/or countersunk portion 217 to accommodate tensioning device 220. For example, as shown in FIG. 2, distal end of tensioning device 220 (e.g., washer 224) can be flush with frontside 216. In some aspects, first jaw member 210 can be L-shaped. For example, as shown in FIG. 2, frontside 216 of first jaw member 210 can extend laterally toward first hook member 310 (e.g., second hook leg 314 shown in FIG. 6) of second jaw member 300. In some aspects, notch 212 can be recessed towards frontside 216 and contact surface 214 can extend towards first hook member 310 of second jaw member 300. For example, as shown in FIGS. 4 and 5, contact surface 214 can be vertically aligned with first hook member 310 (e.g., second hook leg 314 shown in FIG. 6) or second hook member 330 (e.g., second hook leg 334 shown in FIG. 6).

Tensioning device 220 can be configured to tighten support assembly 200 (e.g., clamp assembly 201). For example, tensioning device 220 can be coupled to first and second jaw members 210, 300 in order to increase or decrease a distance between first jaw member 210 (e.g., contact surface 214) and second jaw member 300 (e.g., first hook member 310). In some aspects, tensioning device 220 can include a polymer, a metal, a ceramic, some combination thereof, and/or any other suitably rigid material. For example, tensioning device 220 can include steel, iron, aluminum, nickel, etc.

Tensioning device 220 can include bolt 222 and washer 224. In some aspects, as shown in FIG. 4, bolt 222 can be a threaded bolt (e.g., M10 threads). In some aspects, bolt 222 (e.g., threaded) can extend through first and second hook members 310, 330. In some aspects, washer 224 can be flush with frontside 216 of first jaw member 210. For example, as shown in FIGS. 2-4, frontside 216 can include recessed and/or countersunk portion 217 atop which washer 224 is secured. In some aspects, engagement (e.g., tightening) of tensioning device 220 can be from frontside 202 of support assembly 200 for ease of user access. For example, as shown in FIGS. 2 and 3, a distal end of bolt 222 (e.g., hex head socket cap) can be positioned at frontside 202 of support assembly 200 on frontside 216 of first jaw member 210.

Second jaw member 300 can be configured to clamp load carrier 120, for example, to vehicle bed structure 104. Second jaw member 300 can be opposite first jaw member 210 and together first and second jaw members 210, 300 can form clamp assembly 201. In some aspects, second jaw member 300 is attachable to a plurality of different vehicle bed structures 104. For example, vehicle bed structure 104 can include Chevrolet® Silverado, Chevrolet® Colorado, Dodge RAM® 1500/2500/3500, Ford® F-Series, GMC® Sierra, GMC® Canyon, Jeep® Gladiator, Nissan® Frontier, Nissan® Titan, Toyota® Tacoma, Toyota® Tundra, and/or other pickup truck bed structures. In some aspects, second jaw member 300 can be monolithic. For example, second jaw member 300 can be uniform and formed from a single piece of material, which increases the strength of second jaw member 300 (e.g., can withstand higher stress and/or strain) and reduces manufacturing and assembly time. In some aspects, second jaw member 300 can include a polymer, a metal, a ceramic, some combination thereof, and/or any other suitably rigid material. For example, second jaw member 300 can include extruded aluminum.

Second jaw member 300 can include first hook member 310, gap 320, and second hook member 330. Second hook member 330 can be opposite first hook member 310. Gap 320 can be configured to provide space between first and second hook members 310, 330 such that vehicle bed structure 104 (e.g., interior rail 110, 111) can be received within gap 320. Gap 320 can be disposed between first and second hook members 310, 330. In some aspects, gap 320 can be at least about 19.5 mm. For example, gap 320 can be 20 mm in order to avoid interference of second jaw member 300 with vehicle bed structure 104, for example, interior rail 110, 111 (e.g., "C" track).

In some aspects, first hook member 310 can include a concave portion (e.g., interior hook arc 317 shown in FIG. 6) facing towards first jaw member 210 and be configured to contact vehicle bed structure 104. For example, as shown in FIGS. 2-4, first hook member 310 can face towards first jaw member 210 in first configuration 20 and contact an interior surface of interior rail 110, 111 in locked configuration 10. In some aspects, second hook member 330 can include a concave portion (e.g., interior hook arc 337 shown in FIG. 6) facing away from first jaw member 210 and be configured to contact vehicle bed structure 104. For example, as shown in FIGS. 2-4, second hook member 330 can face away from first jaw member 210 in first configuration 20 and contact an exterior surface of interior rail 110, 111 and/or sidewall 106 in locked configuration 10.

In some aspects, first hook member 310 can include a concave portion (e.g., interior hook arc 317 shown in FIG. 6) facing away from first jaw member 210 and be configured to contact vehicle bed structure 104. For example, as shown in FIG. 5, first hook member 310 can face away from first jaw member 210 in second configuration 30 and contact an exterior surface of interior rail 110, 111 and/or sidewall 106 in locked configuration 10. In some aspects, second hook member 330 can include a concave portion (e.g., interior hook arc 337 shown in FIG. 6) facing towards first jaw member 210 and be configured to contact vehicle bed structure 104. For example, as shown in FIG. 5, second hook member 330 can face towards first jaw member 210 in second configuration 30 and contact an interior surface of interior rail 110, 111 in locked configuration 10.

In some aspects, first and second hook members 310, 330 are interchangeably connected to tensioning device 220 such that first hook member 310 can be disposed between first jaw member 210 and second hook member 330 in a first configuration (e.g., first configuration 20), and second hook member 330 can be disposed between first jaw member 210 and first hook member 310 in a second configuration (e.g., second configuration 30). For example, as shown in FIGS. 2-4, first hook member 310 can be disposed between first jaw member 210 and second hook member 330 in first configuration 20. For example, as shown in FIG. 5, second hook member 330 can be disposed between first jaw member 210 and first hook member 310 in second configuration 30. In some aspects, second jaw member 300 can be rotated 180 degrees relative to a longitudinal axis of tensioning device 220 (e.g., through hole 306 shown in FIGS. 6 and 8) to transition from first configuration 20 to second configuration 30 and from second configuration 30 to first configuration 20.

Figure 7:
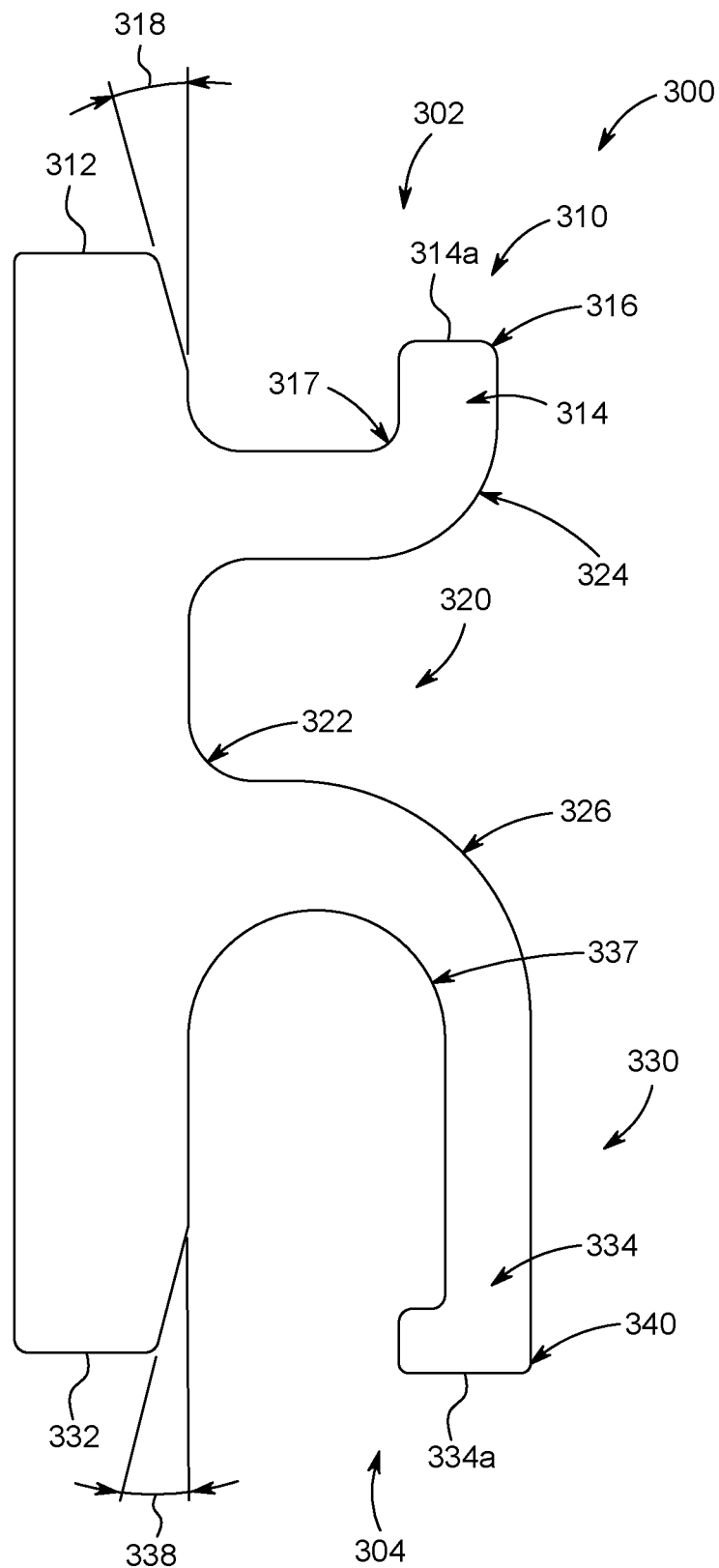
FIGS. 7-9 illustrate a side view of the jaw member shown in FIG. 6.
Figure 9:
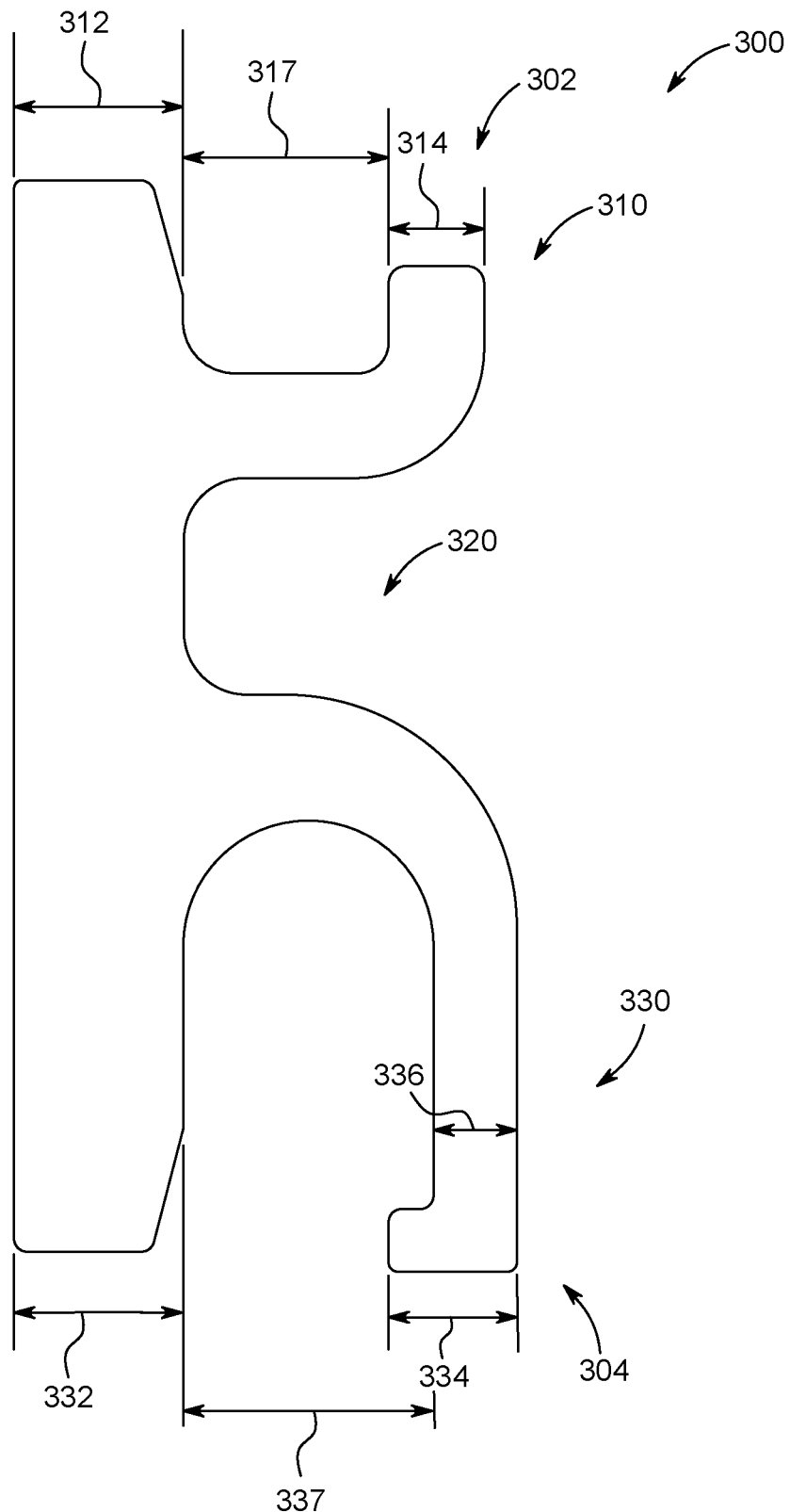

In some aspects, first hook member 310 can be U-shaped. For example, as shown in FIGS. 2-4, first hook member 310 can be U-shaped with a concave portion facing towards first jaw member 210 (e.g., first configuration 20). In some aspects, first hook member 310 can include first and second hook legs 312, 314. For example, first hook leg 312 can be configured to be coupled to tensioning device 220 and second hook leg 314 can be spaced laterally from first hook leg 312 and be configured to be coupled to vehicle bed structure 104 (e.g., interior rail 110, 111) in locked configuration 10. For example, as shown in FIG. 9, second hook leg 314 can be spaced laterally from first hook leg 312 by interior hook arc 317 (e.g., about 19 mm). In some aspects, first hook member 310 can include a bevel configured to accommodate a plurality of different vehicle bed structures 104 and to decrease a distance between second jaw member 300 and vehicle bed structure 104 in locked configuration 10. For example, as shown in FIG. 7, first hook member 310 can include bevel 318 (e.g., about 15 degrees). In some aspects, bevel 318 can have an angle between about 13 degrees and about 17 degrees. For example, bevel 318 can be about 15 degrees.

In some aspects, second hook member 330 can be U-shaped. For example, as shown in FIGS. 2-4, second hook member 330 can be U-shaped with a concave portion facing away from first jaw member 210 (e.g., first configuration 20). In some aspects, second hook member 330 can include first and second hook legs 332, 334. For example, first hook leg 332 can be configured to be coupled to tensioning device 220 and second hook leg 334 can be spaced laterally from first hook leg 332 and be configured to be coupled to vehicle bed structure 104 (e.g., sidewall 106) in locked configuration 10. For example, as shown in FIG. 9, second hook leg 334 can be spaced laterally from first hook leg 332 by interior hook arc 337 (e.g., about 23 mm). In some aspects, second hook member 330 can include a bevel configured to accommodate a plurality of different vehicle bed structures 104 and to decrease a distance between second jaw member 300 and vehicle bed structure 104 in locked configuration 10. For example, as shown in FIG. 7, second hook member 330 can include bevel 338 (e.g., about 15 degrees). In some aspects, bevel 338 can have an angle between about 13 degrees and about 17 degrees. For example, bevel 338 can be about 15 degrees.

Figure 12:
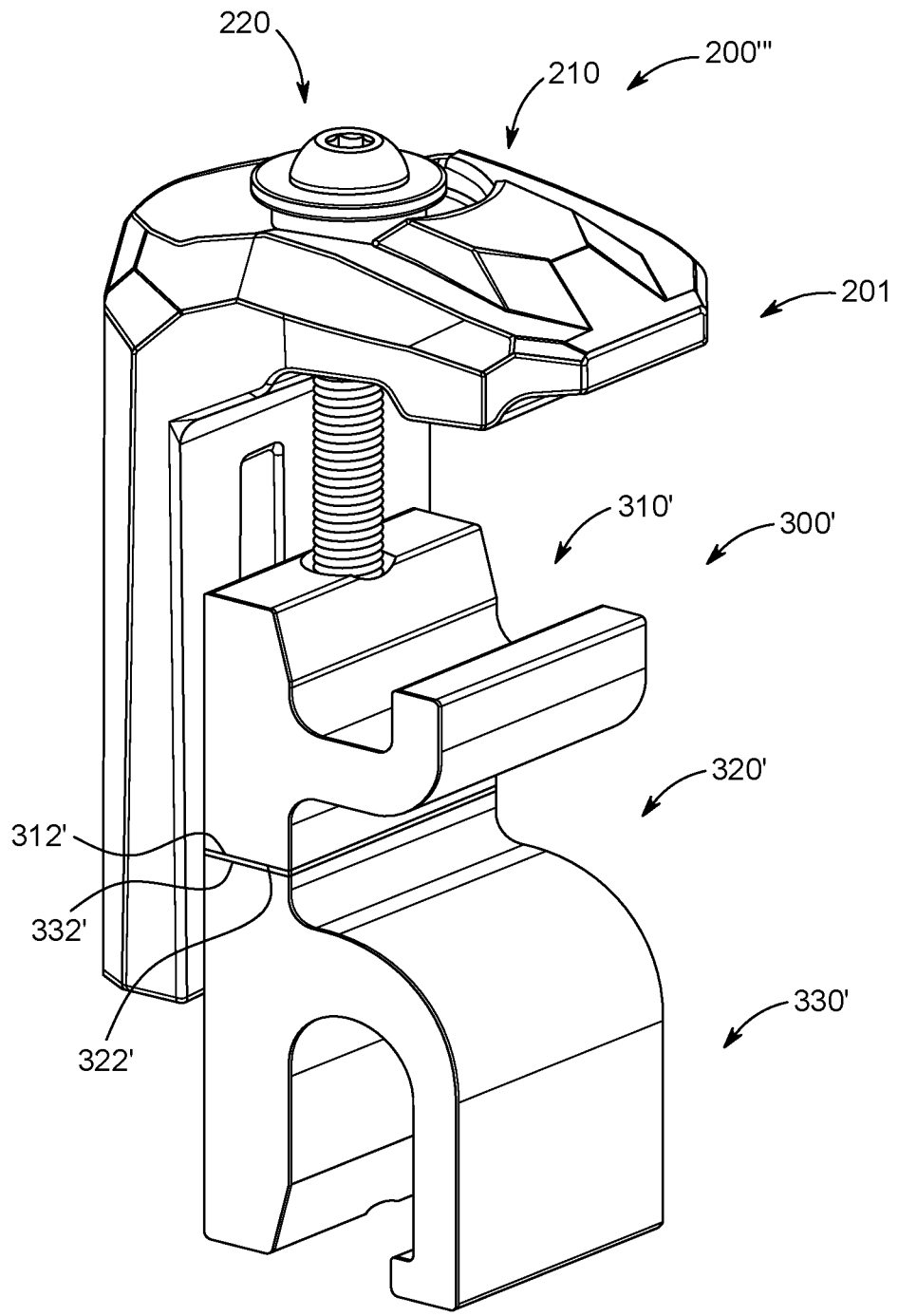
FIG. 12 illustrates a front perspective view of a support assembly, according to an aspect.
Figure 13:
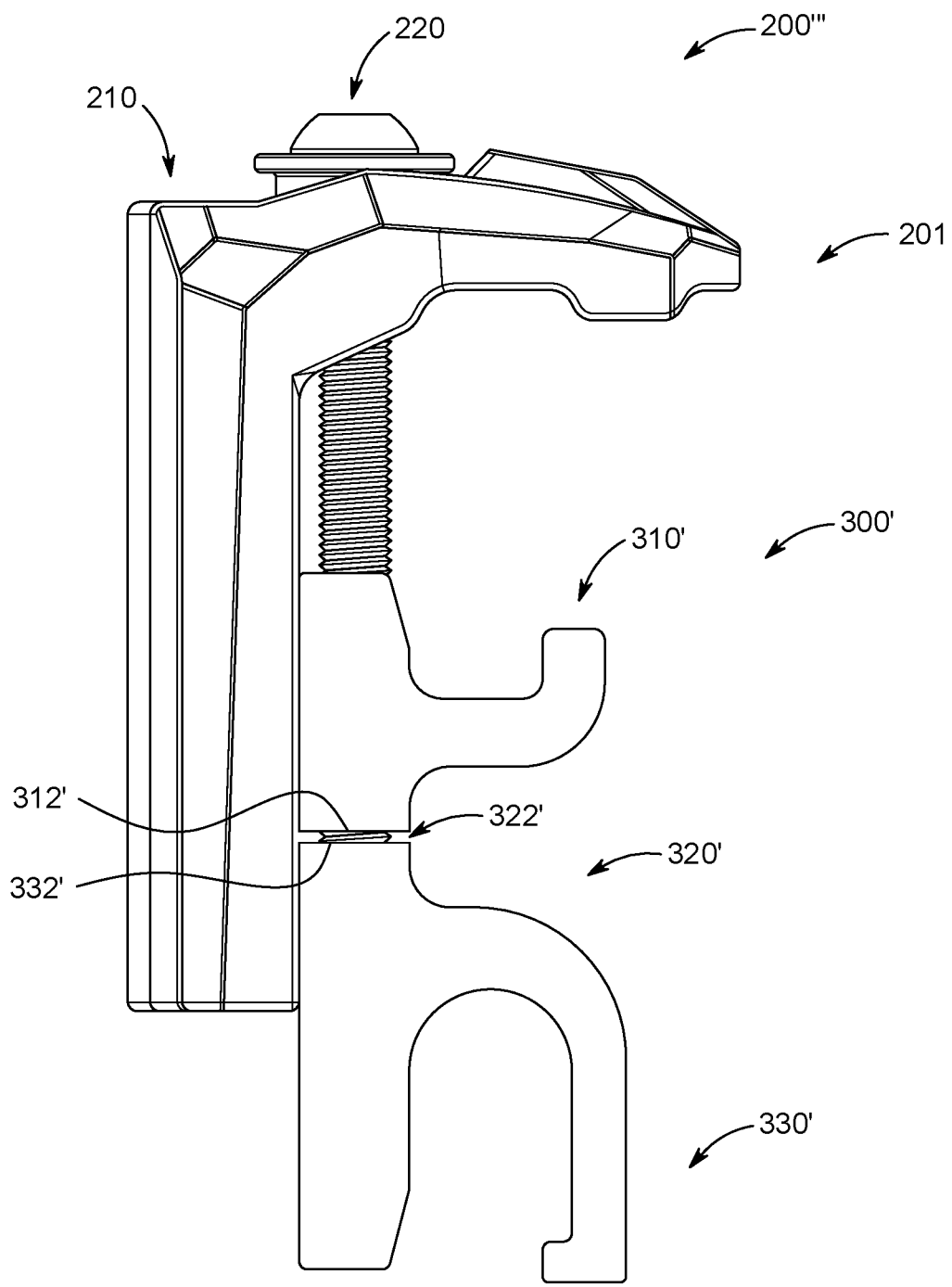
FIG. 13 illustrates a side view of the support assembly shown in FIG. 12.

In some aspects, first and second hook members 310, 330 can be separated from each other along a transverse edge (e.g., first and second hook member contact surfaces 312', 332'). For example, as shown in FIGS. 12 and 13, first and second hook members 310', 330' of support assembly 200''' can be separated from each other by physical gap 322' and connected to each other by tensioning device 220 along first and second hook member contact surfaces 312', 332'.

Example Jaw Member

Figure 6:
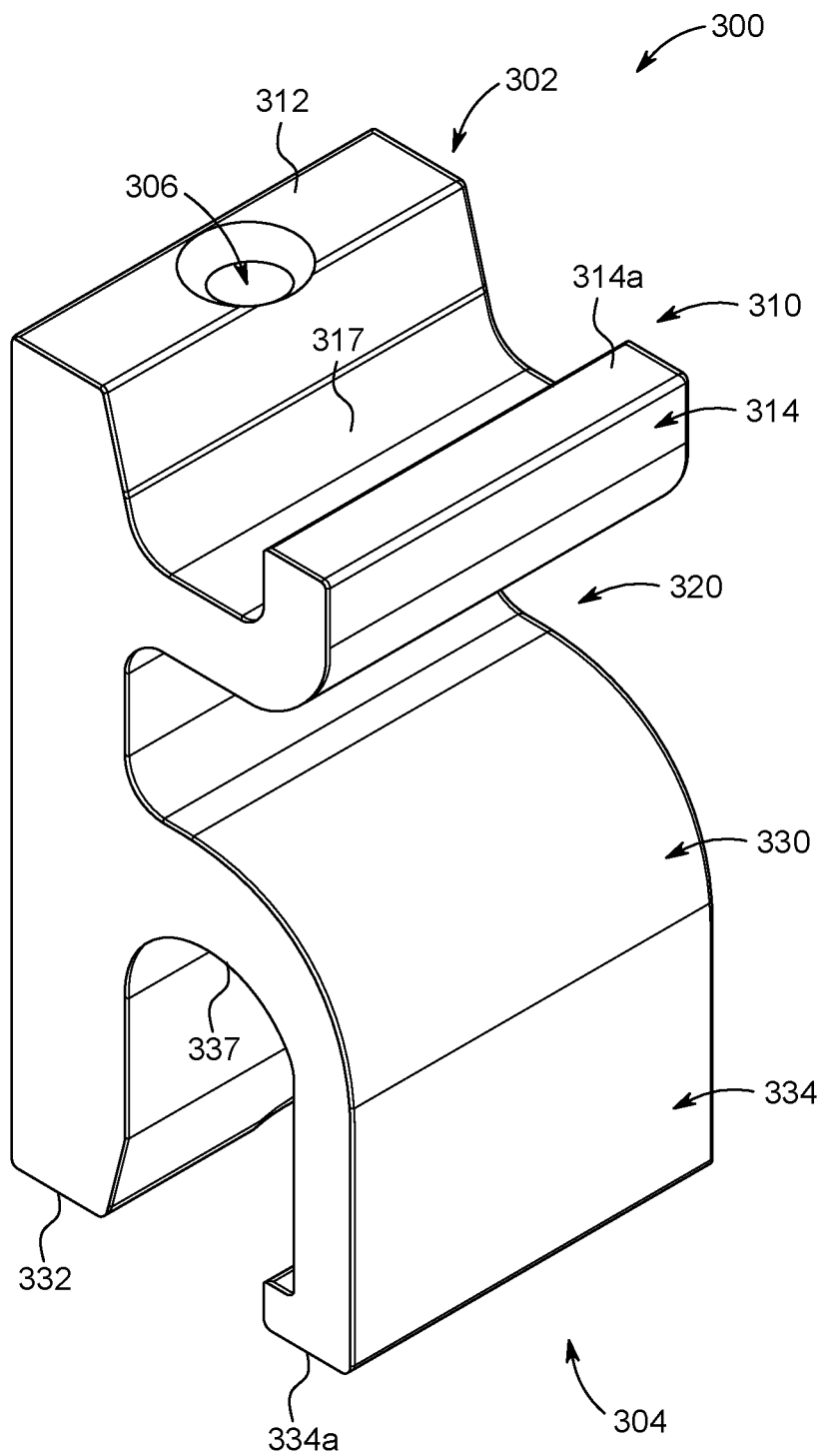
FIG. 6 illustrates a front perspective view of a jaw member, according to an aspect.
Figure 8:
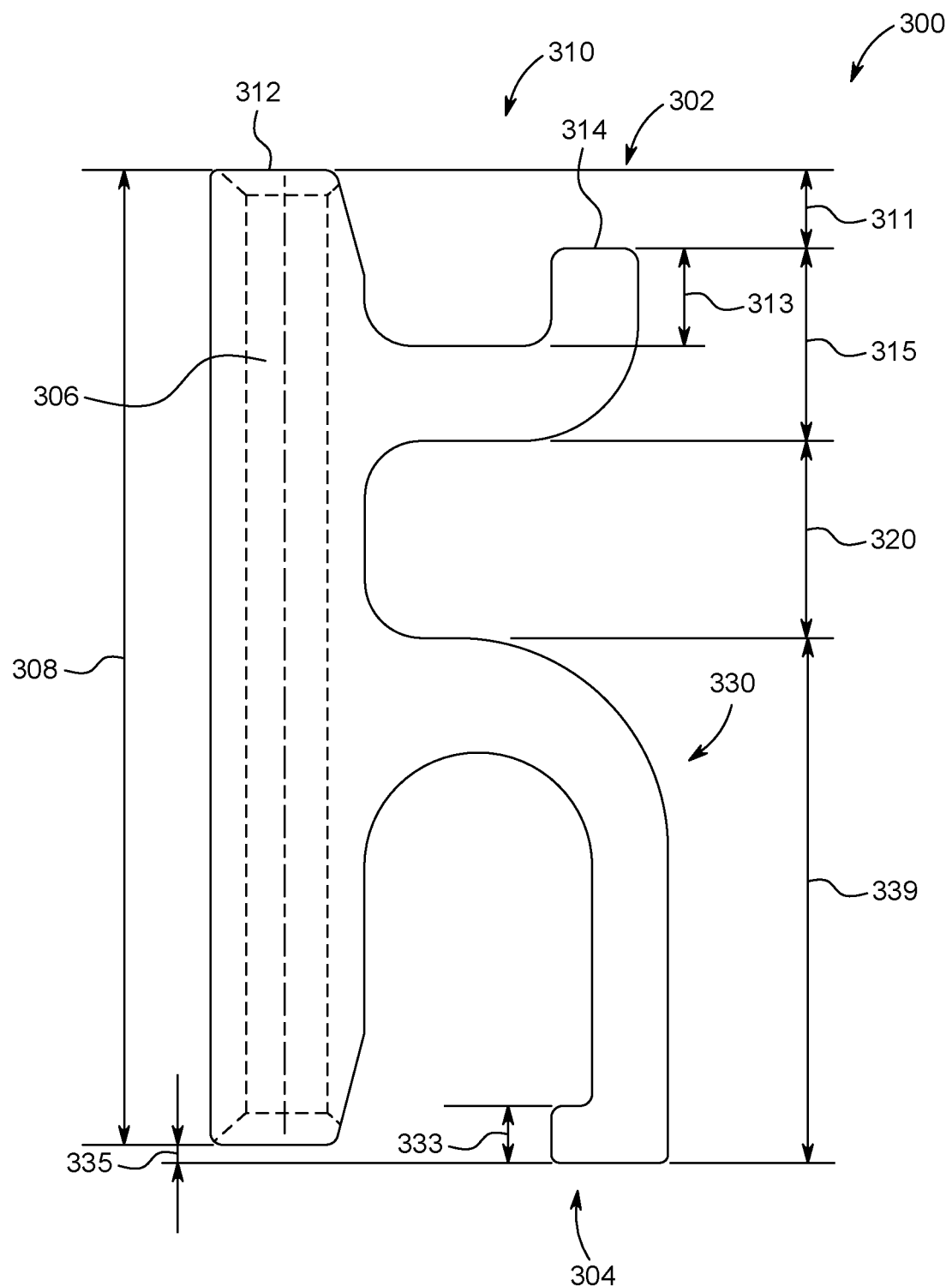

FIGS. 6-9 illustrate second jaw member 300, according to aspects. FIG. 6 illustrates a front perspective view of second jaw member 300. FIGS. 7-9 illustrate a side view of second jaw member 300 shown in FIG. 6. Second jaw member 300 can be configured to clamp load carrier 120 to vehicle bed structure 104. Although second jaw member 300 is shown in FIGS. 6-9 as a stand-alone apparatus and/or system, the aspects of this disclosure can be used with other apparatuses and/or systems, such as, but not limited to load carrier system 100, load carrier 120, support assembly 200, 200', 200'', 200''', first jaw member 210, tensioning device 220, extension piece 400, lock assembly 500, and/or other vehicles. In some aspects, second jaw member 300 can be part of support assembly 200. In some aspects, second jaw member 300 can be implemented on different vehicles 102. For example, vehicle 102 can include Chevrolet® Silverado, Chevrolet® Colorado, Dodge RAM® 1500/2500/3500, Ford® F-Series, GMC® Sierra, GMC® Canyon, Jeep® Gladiator, Nissan® Frontier, Nissan® Titan, Toyota® Tacoma, Toyota® Tundra, and/or other pickup trucks.

As shown in FIGS. 6-9, second jaw member 300 can include frontside 302, backside 304, through hole 306, longitudinal side 308, first hook member 310, gap 320, and second hook member 330. In some aspects, frontside 302 can be configured to face towards first jaw member 210. For example, frontside 302 can face towards first jaw member 210 in first configuration 20. In some aspects, backside 304 can be configured to face towards first jaw member 210. For example, backside 304 can face towards first jaw member 210 in second configuration 30.

Through hole 306 can be configured to couple to tensioning device 220. For example, through hole 306 can be threaded (e.g., M10 thread) and receive threaded bolt 222 (e.g., M10 thread). In some aspects, through hole 306 can be threaded all the way through second jaw member 300 in order to have adequate thread engagement with tensioning device 220 (e.g., threaded bolt 222) in both first and second configurations 20, 30. Longitudinal side 308 can be configured to be opposite an interior surface of first jaw member 210. In some aspects, longitudinal side 308 is substantially flat and configured to distribute a force and/or a torque exerted on tensioning device 220 (e.g., bolt 222) to an opposite interior surface of first jaw member 210. In some aspects, longitudinal side 308 is at least about 80 mm in length in order to provide adequate thread engagement with tensioning device 220 (e.g., threaded bolt 222) in both first and second configurations 20, 30. For example, longitudinal side 308 can be about 100 mm in length. In some aspects, longitudinal side 308 can have a length of about 80 mm to about 120 mm. For example, longitudinal side 308 can have a length of about 95 mm to about 105 mm. In some aspects, second jaw member 300 can have a depth (thickness) of at least about 30 mm. For example, second jaw member 300 can have a depth (thickness) of about 50 mm.

First hook member 310 can be configured to couple to tensioning device 220 and vehicle bed structure 104 in locked configuration 10. First hook member 310 can include first hook leg 312, second hook leg 314, and interior hook arc 317. First hook leg 312 can include through hole 306 for tensioning device 220 (e.g., bolt 222). Second hook leg 314 can be configured to couple to vehicle bed structure 104 in locked configuration 10. Second hook leg 314 can be spaced laterally from first hook leg 312 by interior hook arc 317. In some aspects, as shown in FIG. 9, first hook leg 312 can have a width of at least about 16 mm in order to accommodate through hole 306 and bolt 222. In some aspects, as shown in FIG. 9, interior hook arc 317 can be about 19 mm.

In some aspects, as shown in FIG. 9, second hook leg 314 can have a width of about 9 mm. In some aspects, second hook leg 314 can include distal contact surface 314a having a surface area of at least about 270 mm² to distribute a force between first hook member 310 and vehicle bed structure 104 along distal contact surface 314a in locked configuration 10. For example, as shown in FIG. 6, distal end (e.g., distal contact surface 314a) of second hook leg 314 can have an exterior surface area of about 450 mm².

In some aspects, first hook leg 312 can be vertically offset relative to second hook leg 314. For example, as shown in FIG. 8, second hook leg 314 can be vertically below first hook leg 312 by hook height distance 311. In some aspects, hook height distance 311 can be about 8 mm. In some aspects, second hook leg 314 can have a distal vertical length (height) above interior hook arc 317 denoted second hook distal height 313. For example, as shown in FIG. 8, second hook distal height 313 can be about 10 mm. In some aspects, second hook leg 314 can have a vertical length (height) above gap 320 denoted second hook height 315.

Second hook height 315 can be configured to position second jaw member 300 relative to vehicle bed structure 104 (e.g., interior rail 110, 111) and reduce interference between first hook member 310 and an interior surface of interior rail 110, 111 (e.g., "C" track). In some aspects, second hook height 315 can be about 19.5 mm to about 21 mm. For example, as shown in FIG. 8, second hook height 315 can be about 20 mm. In some aspects, second hook leg 314 can include rounded (e.g., smooth) edges to reduce interference (e.g., damage) with vehicle bed structure 104. For example, as shown in FIG. 7, exterior surface of second hook leg 314 can include rounded edges 316. In some aspects, first hook leg 312 can include bevel 318 configured to guide (catch) second jaw member 300 onto a plurality of different vehicle bed structures 104 and/or decrease a distance between first hook member 310 and vehicle bed structure 104 in locked configuration 10 (e.g., first configuration 20). In some aspects, bevel 318 can have an angle of at least about 13 degrees. For example, as shown in FIG. 7, bevel 318 can have an angle of about 15 degrees.

Gap 320 can be configured to provide space between first and second hook members 310, 330 such that vehicle bed structure 104 (e.g., interior rail 110, 111) can be received within gap 320. Gap 320 can be disposed between first and second hook members 310, 330. In some aspects, gap 320 can be at least about 19.5 mm in order to provide space for vehicle bed structure 104 within gap 320. For example, gap 320 can be about 20 mm to accommodate a variety of different vehicle bed structures 104. In some aspects, gap 320 can be C-shaped. For example, as shown in FIG. 7, gap 320 can be a C-shaped horizontal notch and/or cutout. Gap 320 can include rounded cut 322, first hook arc 324, and second hook arc 326. First hook arc 324 can be integral with first hook member 310 and second hook arc 326 can be integral with second hook member 330.

Second hook member 330 can be configured to couple to tensioning device 220 and vehicle bed structure 104 in locked configuration 10. Second hook member 330 can include first hook leg 332, second hook leg 334, and interior hook arc 337. First hook leg 332 can include through hole 306 for tensioning device 220 (e.g., bolt 222). Second hook leg 334 can be configured to couple to vehicle bed structure 104 in locked configuration 10. Second hook leg 334 can be spaced laterally from first hook leg 332 by interior hook arc 337. In some aspects, as shown in FIG. 9, first hook leg 332 can have a width of at least about 16 mm in order to accommodate through hole 306 and bolt 222. In some aspects, as shown in FIG. 9, interior hook arc 337 can be about 23 mm.

In some aspects, as shown in FIG. 9, second hook leg 334 can have a width of about 12 mm. In some aspects, second hook leg 334 can have a body width that is less than a distal end width. For example, as shown in FIG. 9, second hook leg 334 can have second hook leg body width 336 that is less than a distal end width 334.

Second hook leg body width 336 can be configured to provide adequate clearance of vehicle bed structure 104, for example, interior rail 110, 111 (e.g., "C" track). In some aspects, second hook leg body width 336 can be about 6 mm to about 12 mm. For example, as shown in FIG. 9, second hook leg body width 336 can be about 8 mm. In some aspects, second hook leg 334 can include distal contact surface 334a having a surface area of at least about 360 mm² to distribute a force between second hook member 330 and vehicle bed structure 104 along distal contact surface 334a in locked configuration 10. For example, as shown in FIG. 6, distal end (e.g., distal contact surface 334a) of second hook leg 334 can have an exterior surface area of about 600 mm².

In some aspects, first hook leg 332 can be vertically offset relative to second hook leg 334. For example, as shown in FIG. 8, second hook leg 334 can be vertically below first hook leg 332 by hook height distance 335. In some aspects, hook height distance 335 can be about 2 mm. In some aspects, second hook leg 334 can have a distal vertical length (height) above second hook leg body width 336 denoted second hook distal height 333. For example, as shown in FIG. 8, second hook distal height 333 can be about 6 mm. In some aspects, second hook leg 334 can have a vertical length (height) below gap 320 denoted second hook height 339.

Second hook height 339 can be configured to position second jaw member 300 relative to vehicle bed structure 104 (e.g., interior rail 110, 111) and reduce interference between second hook member 330 and an interior surface of interior rail 110, 111 (e.g., "C" track). In some aspects, second hook height 339 can be about 32 mm to about 52 mm. For example, as shown in FIG. 8, second hook height 339 can be about 42 mm. In some aspects, second hook leg 334 can include rounded (e.g., smooth) edges to reduce interference (e.g., damage) with vehicle bed structure 104. For example, as shown in FIG. 7, exterior surface of second hook leg 334 can include rounded edges 340. In some aspects, first hook leg 332 can include bevel 338 configured to guide (catch) second jaw member 300 onto a plurality of different vehicle bed structures 104 and/or decrease a distance between second hook member 330 and vehicle bed structure 104 in locked configuration 10 (e.g., second configuration 30). In some aspects, bevel 338 can have an angle of at least about 13 degrees. For example, as shown in FIG. 7, bevel 338 can have an angle of about 15 degrees.

Example Support Assembly with Extension

Figure 10:
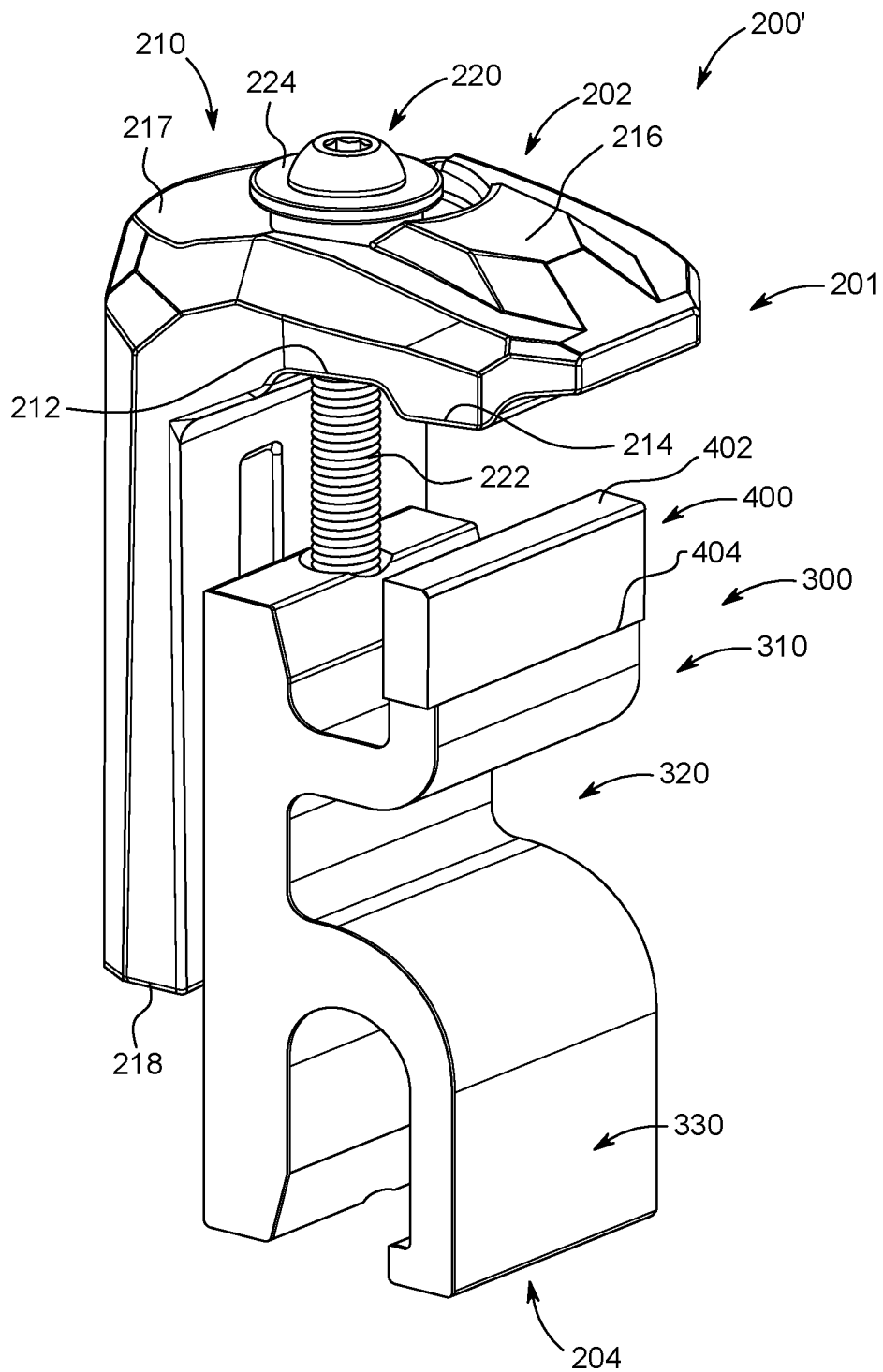
FIG. 10 illustrates a front perspective view of a support assembly, according to an aspect.

FIG. 10 illustrates support assembly 200', according to aspects. FIG. 10 illustrates a front perspective view of support assembly 200'. Support assembly 200' can be configured to accommodate additional different vehicle bed structures 104 with extension piece 400.

FIG. 10 illustrates support assembly 200', according to certain aspects. The aspects of support assembly 200 shown in FIGS. 2-5, for example, and the aspects of support assembly 200' shown in FIG. 10 may be similar. Similar reference numbers are used to indicate features of the aspects of support assembly 200 shown in FIGS. 2-5 and the similar features of the aspects of support assembly 200' shown in FIG. 10. One difference between the aspects of support assembly 200 shown in FIGS. 2-5 and the aspects of support assembly 200' shown in FIG. 10 is that support assembly 200' includes extension piece 400 disposed atop first hook member 310 rather than just first hook member 310 shown in FIGS. 2-5. Although support assembly 200' is shown in FIG. 10 as a stand-alone apparatus and/or system, the aspects of this disclosure can be used with other apparatuses and/or systems, such as, but not limited to load carrier system 100, load carrier 120, support assembly 200, 200", 200"', first jaw member 210, tensioning device 220, second jaw member 300, lock assembly 500, and/or other various vehicles. In some aspects, support assembly 200' can be part of load carrier system 100. In some aspects, support assembly 200' can be implemented on different vehicles 102. For example, vehicle 102 can include Chevrolet® Silverado, Chevrolet® Colorado, Dodge RAM® 1500/2500/3500, Ford® F-Series, GMC® Sierra, GMC® Canyon, Jeep® Gladiator, Nissan® Frontier, Nissan® Titan, Toyota® Tacoma, Toyota® Tundra, and/or other pickup trucks.

As shown in FIG. 10, support assembly 200' can include extension piece 400. Extension piece 400 can be configured to extend second hook distal height 313 (shown in FIG. 8) in order to better contact vehicle bed structure 104, for example, for certain vehicles 102. Extension piece 400 can include distal (contact) end 402 and proximal end 404 opposite distal end 402. In some aspects, extension piece 400 can be disposed on second hook leg 314 of first hook member 310. In some aspects, extension piece 400 can include a polymer, a metal, a ceramic, some combination thereof, and/or any other suitably rigid material. For example, extension piece 400 can include extruded aluminum. In some aspects, extension piece 400 can be removable. For example, extension piece 400 can be detached and reattached to second hook leg 314 of first hook member 310.

Example Support Assembly with Lock

Figure 11:
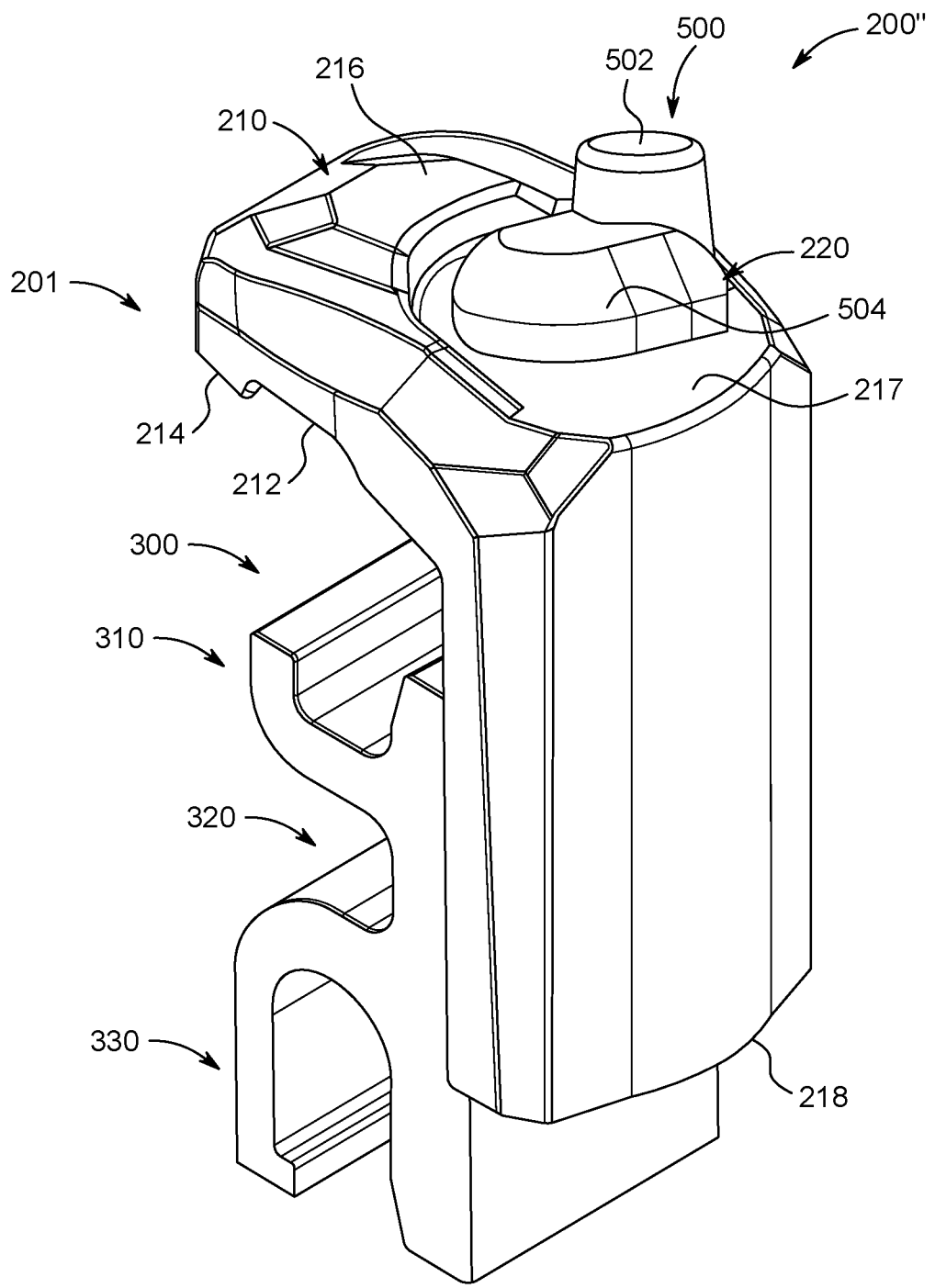
FIG. 11 illustrates a rear perspective view of a support assembly, according to an aspect.

FIG. 11 illustrates support assembly 200", according to aspects. FIG. 11 illustrates a rear perspective view of support assembly 200". Support assembly 200" can be configured to provide additional security and protection to load carrier system 100 with lock assembly 500.

FIG. 11 illustrates support assembly 200", according to certain aspects. The aspects of support assembly 200 shown in FIGS. 2-5, for example, and the aspects of support assembly 200" shown in FIG. 11 may be similar. Similar reference numbers are used to indicate features of the aspects of support assembly 200 shown in FIGS. 2-5 and the similar features of the aspects of support assembly 200" shown in FIG. 11. One difference between the aspects of support assembly 200 shown in FIGS. 2-5 and the aspects of support assembly 200" shown in FIG. 11 is that support assembly 200" includes lock assembly 500 disposed atop first jaw member 210 and covering tensioning device 220 rather than just exposed tensioning device 220 shown in FIGS. 2-5. Although support assembly 200" is shown in FIG. 11 as a stand-alone apparatus and/or system, the aspects of this disclosure can be used with other apparatuses and/or systems, such as, but not limited to load carrier system 100, load carrier 120, support assembly 200, 200', 200"', first jaw member 210, tensioning device 220, second jaw member 300, extension piece 400, and/or other various vehicles. In some aspects, support assembly 200" can be part of load carrier system 100. In some aspects, support assembly 200" can be implemented on different vehicles 102. For example, vehicle 102 can include Chevrolet® Silverado, Chevrolet® Colorado, Dodge RAM® 1500/2500/3500, Ford® F-Series, GMC® Sierra, GMC® Canyon, Jeep® Gladiator, Nissan® Frontier, Nissan® Titan, Toyota® Tacoma, Toyota® Tundra, and/or other pickup trucks.

As shown in FIG. 11, support assembly 200" can include lock assembly 500. Lock assembly 500 can be configured to provide additional security and protection to load carrier system 100. Lock assembly 500 can include actuator 502 and cover 504. In some aspects, actuator 502 can include a key cylinder to lock and unlock cover 504 secured to first jaw member 210 and disposed over tensioning device 220. For example, as shown in FIG. 11, cover 504 can be disposed over a distal end of tensioning device 220 (e.g., bolt 222) and secured to frontside 216 of first jaw member 210.

Example Support Assembly with Split Jaw Member

FIGS. 12 and 13 illustrate support assembly 200"', according to aspects. FIG. 12 illustrates a front perspective view of support assembly 200"'. FIG. 13 illustrates a side view of support assembly 200"' shown in FIG. 12. Support assembly 200"' can be configured to have split second jaw member 300' with separate first and second hook members 310, 330.

FIGS. 12 and 13 illustrate support assembly 200"', according to certain aspects. The aspects of support assembly 200 shown in FIGS. 2-5, for example, and the aspects of support assembly 200"' shown in FIGS. 12 and 13 may be similar. Similar reference numbers are used to indicate features of the aspects of support assembly 200 shown in FIGS. 2-5 and the similar features of the aspects of support assembly 200"' shown in FIGS. 12 and 13. One difference between the aspects of support assembly 200 shown in FIGS. 2-5 and the aspects of support assembly 200"' shown in FIGS. 12 and 13 is that support assembly 200"' includes second jaw member 300' with separated first and second hook members 310', 330' which can be separated by physical gap 322' (or the separate pieces can contact each another) rather than monolithic second jaw member 300 shown in FIGS. 2-5. Although support assembly 200"' is shown in FIGS. 12 and 13 as a stand-alone apparatus and/or system, the aspects of this disclosure can be used with other apparatuses and/or systems, such as, but not limited to load carrier system 100, load carrier 120, support assembly 200, 200', 200", first jaw member 210, tensioning device 220, second jaw member 300, extension piece 400, lock assembly 500, and/or other various vehicles. In some aspects, support assembly 200"' can be part of load carrier system 100. In some aspects, support assembly 200"' can be implemented on different vehicles 102. For example, vehicle 102 can include Chevrolet® Silverado, Chevrolet® Colorado, Dodge RAM® 1500/2500/3500, Ford® F-Series, GMC®

Sierra, GMC® Canyon, Jeep® Gladiator, Nissan® Frontier, Nissan® Titan, Toyota® Tacoma, Toyota® Tundra, and/or other pickup trucks.

As shown in FIGS. 12 and 13, support assembly 200''' can include split second jaw member 300'. Second jaw member 300' can include first hook member 310', gap 320', and second hook member 330'. Gap 320' can include physical gap 322' (e.g., cut along transverse edge of second jaw member 300') that spatially separates first and second hook members 310', 330'. First hook member 310' can include first hook member contact surface 312' disposed above physical gap 322' on a proximal exterior surface of first hook leg 312. Second hook member 330' can include second hook member contact surface 332' disposed below physical gap 322' on a distal exterior surface of first hook leg 332. First hook member contact surface 312' is configured to contact second hook member contact surface 332' in locked configuration 10. In some aspects, first hook member 310 and/or second hook member 330 can be coupled to tensioning device 220. For example, as shown in FIG. 13, both first and second hook members 310, 330 can be coupled to tensioning device 220 via threaded bolt 222.

Example Load Carrier System

Figure 14:
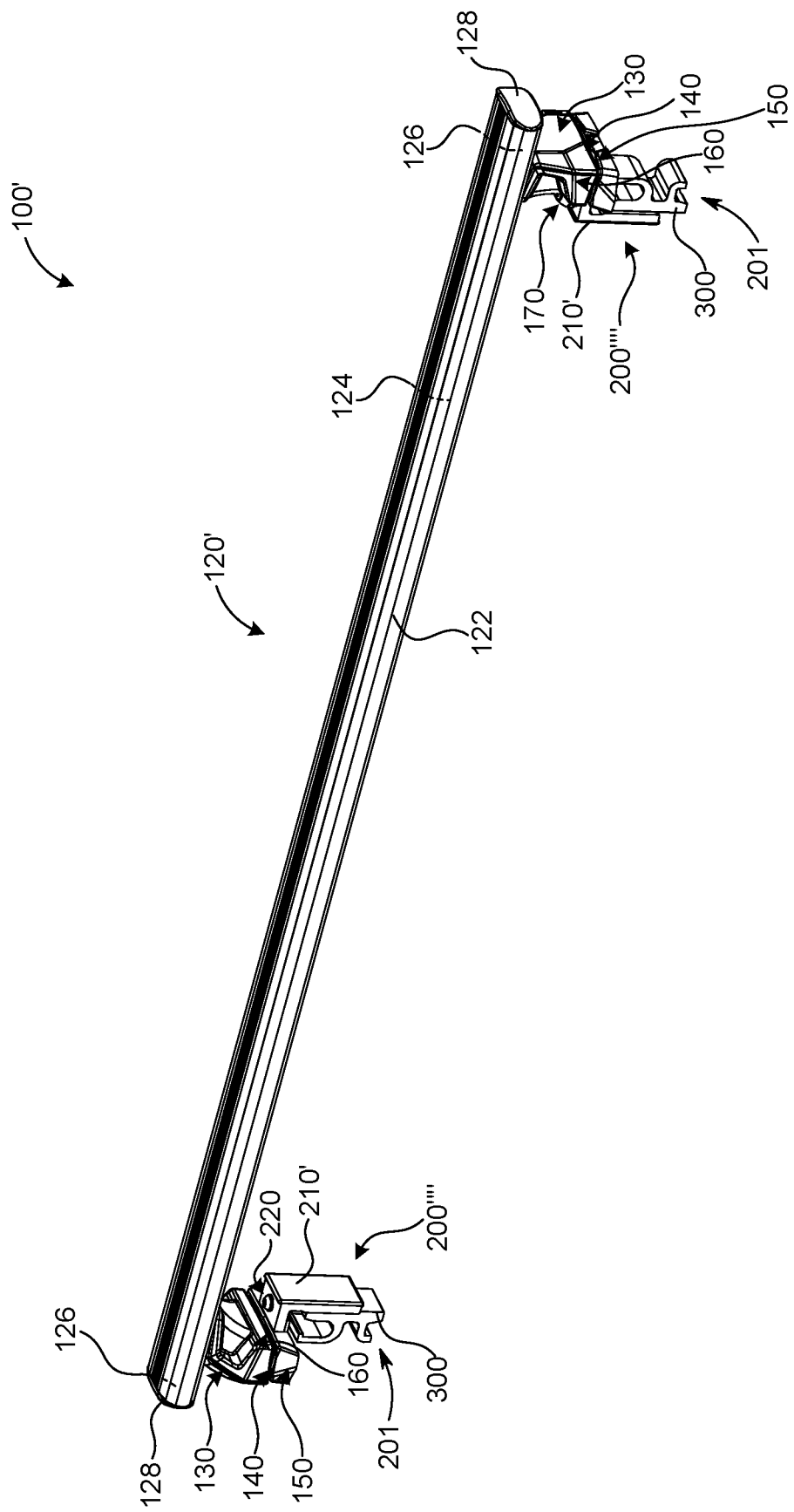
FIG. 14 illustrates a side perspective view of a load carrier system, according to an aspect.
Figure 15:
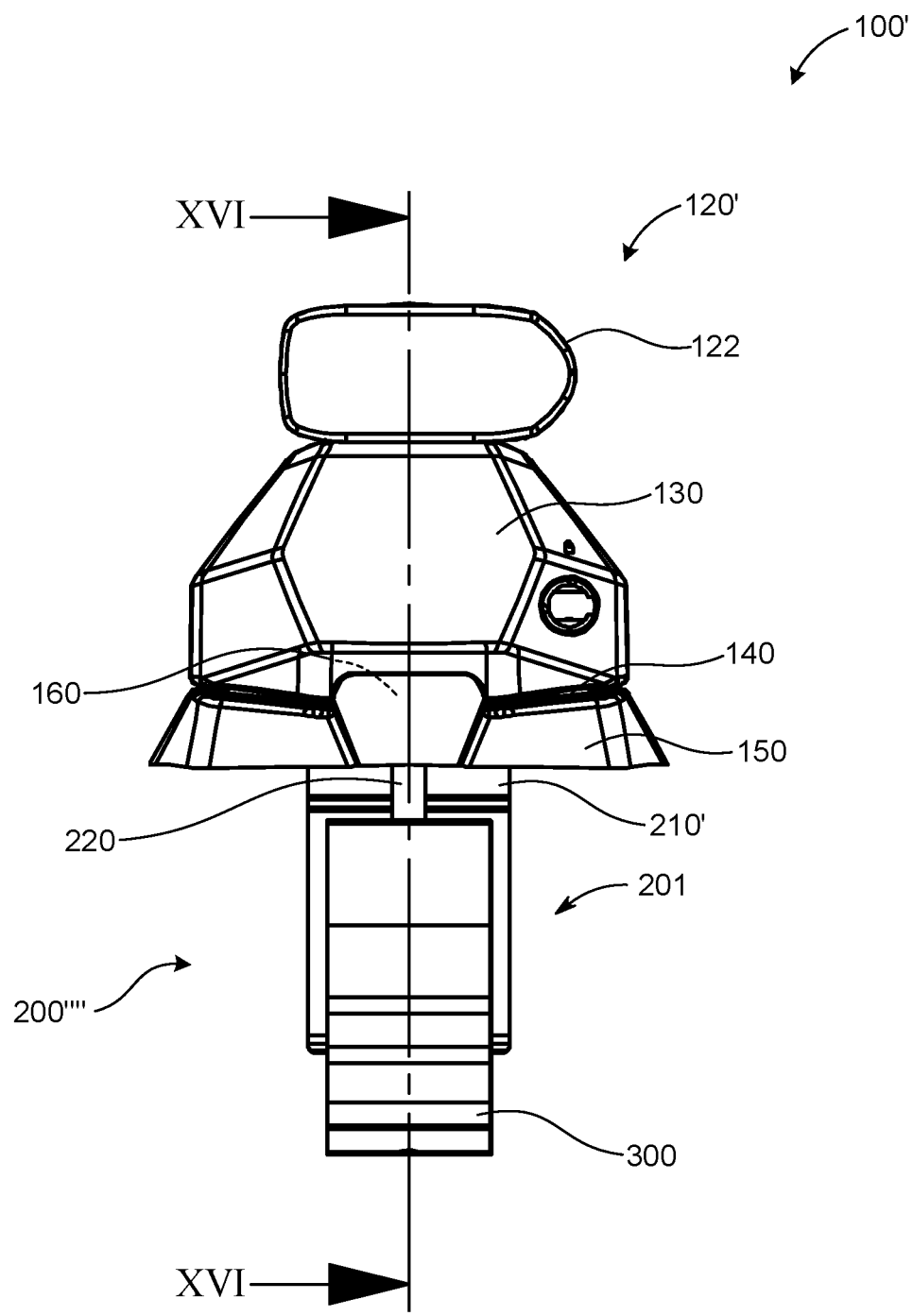
FIG. 15 illustrates a front view of a load carrier of the load carrier system shown in FIG. 14, according to an aspect.
Figure 16:
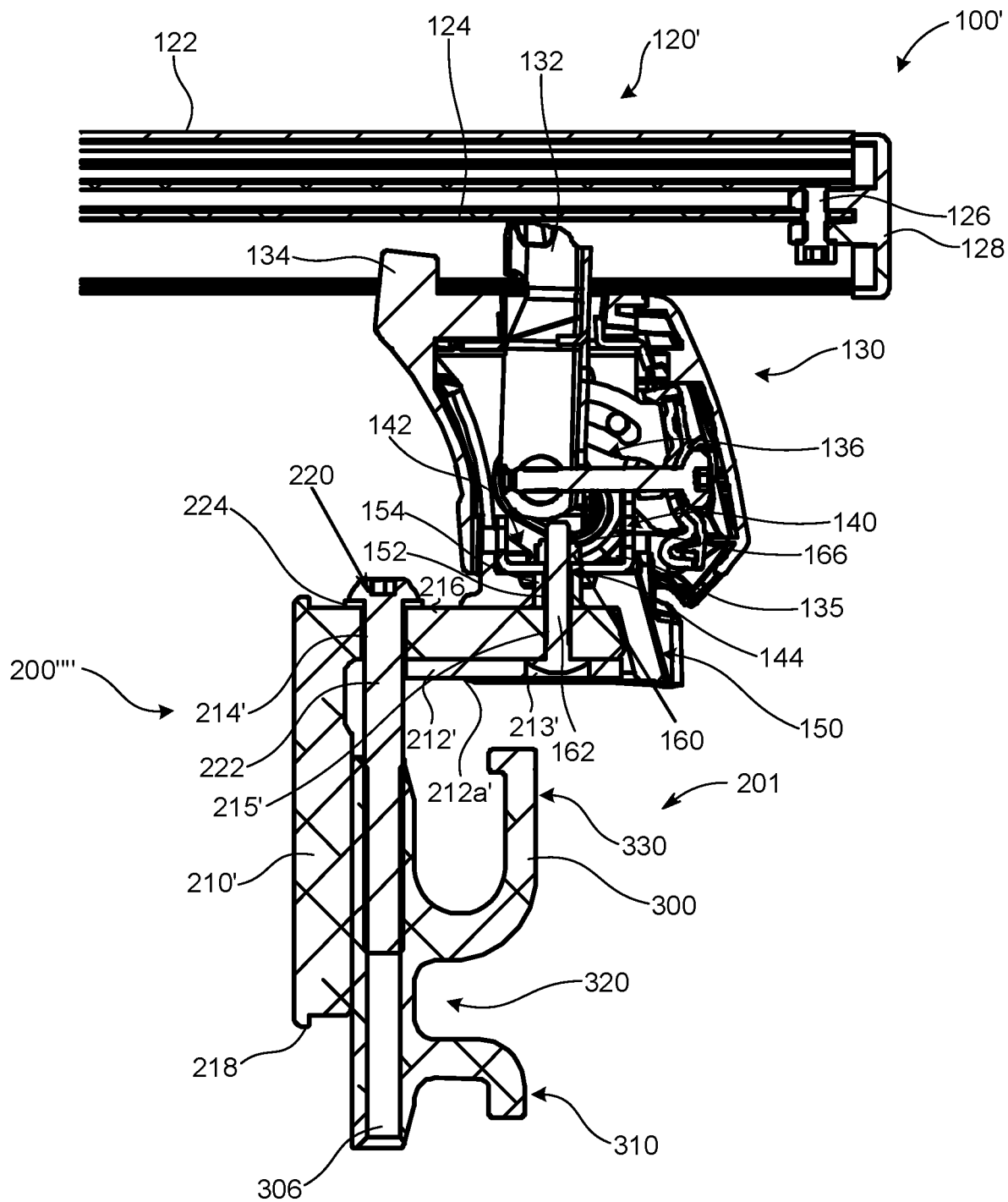
FIG. 16 illustrates a cross-sectional view of the load carrier shown in FIG. 15.
Figure 17:
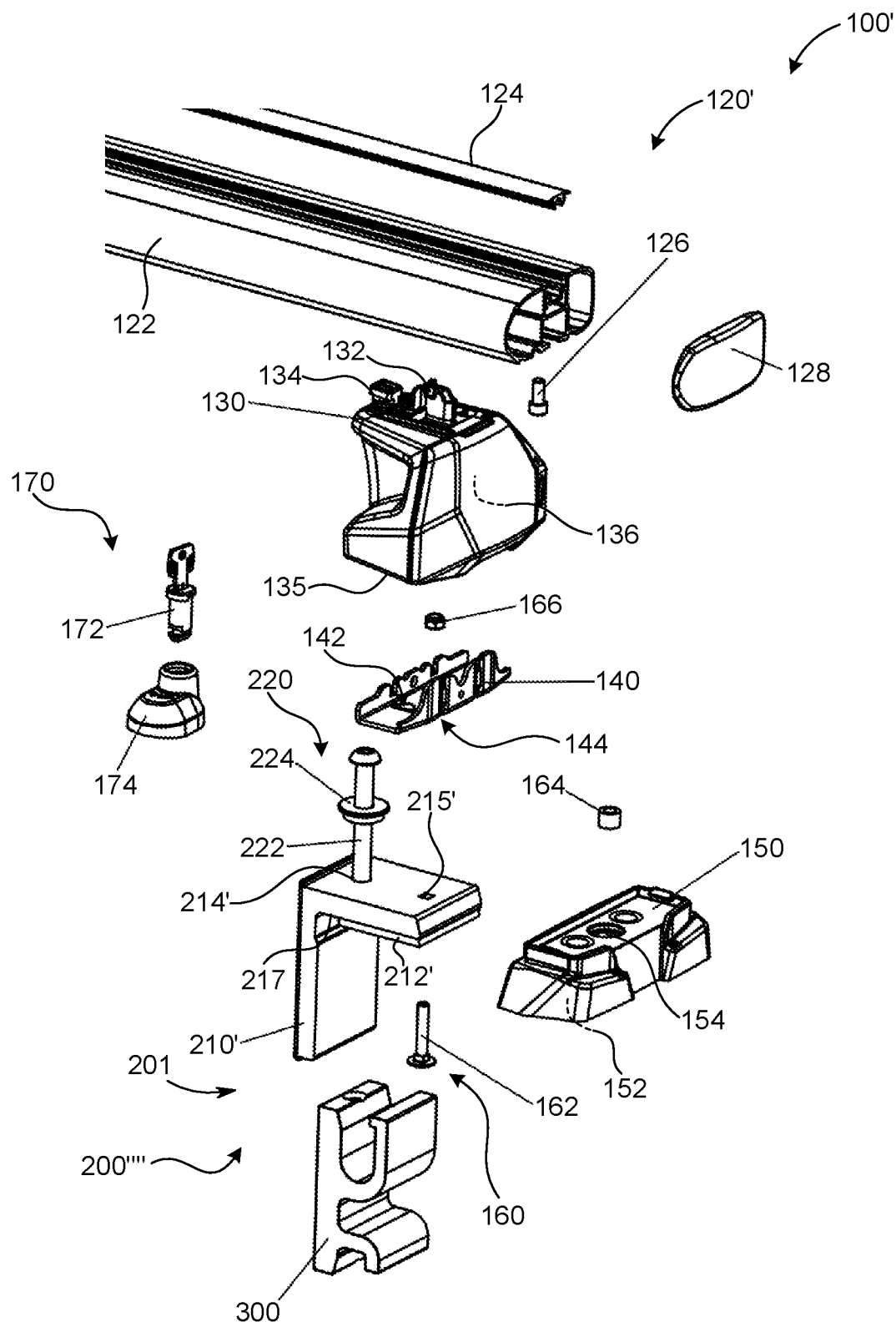
FIG. 17 illustrates an exploded side perspective view of the load carrier shown in FIG. 15.
Figure 18:
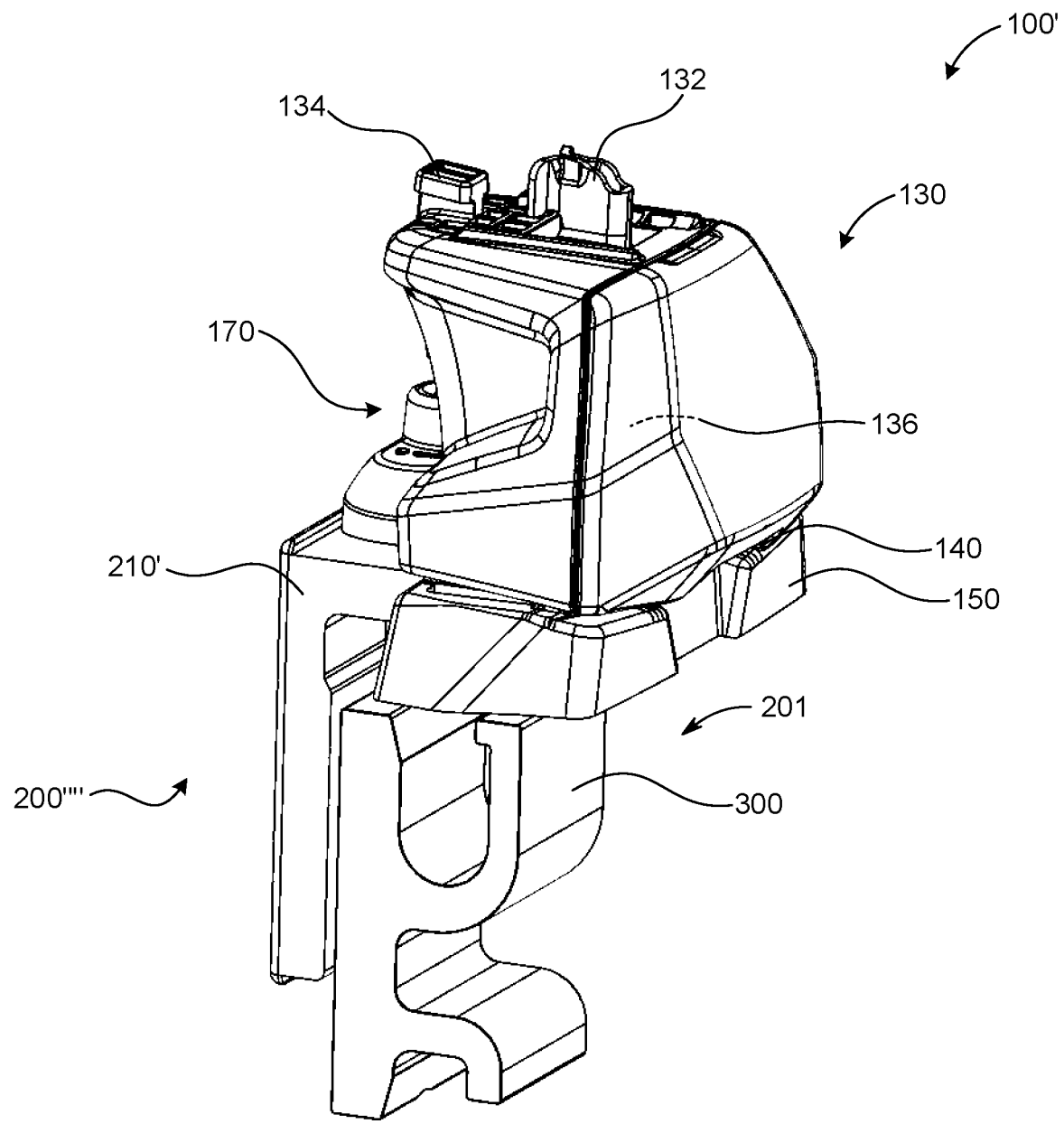
FIG. 18 illustrates a partial front perspective view of the load carrier shown in FIG. 15.
Figure 19:
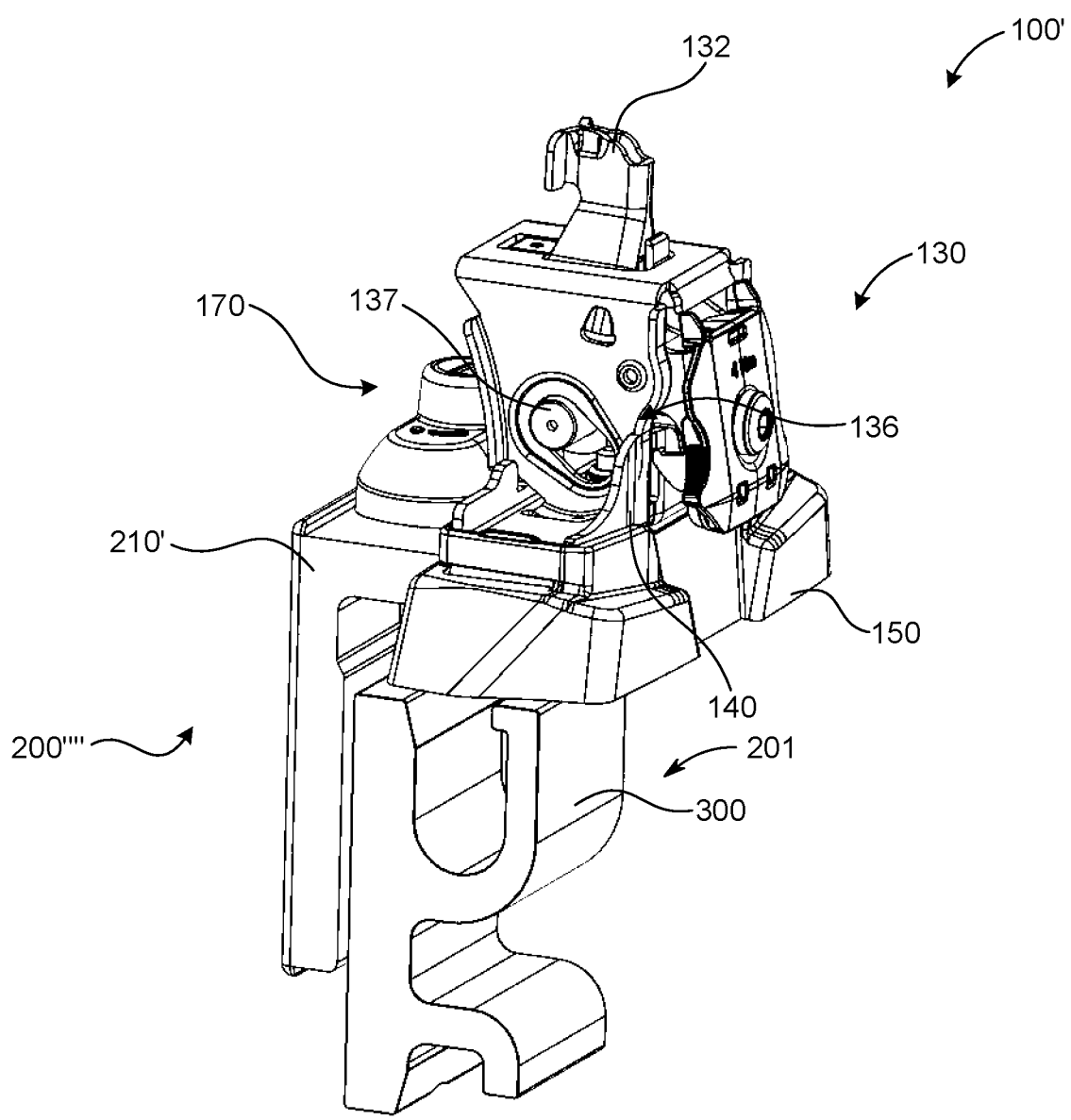
FIG. 19 illustrates a partial front perspective view of the load carrier shown in FIG. 18.
Figure 20:
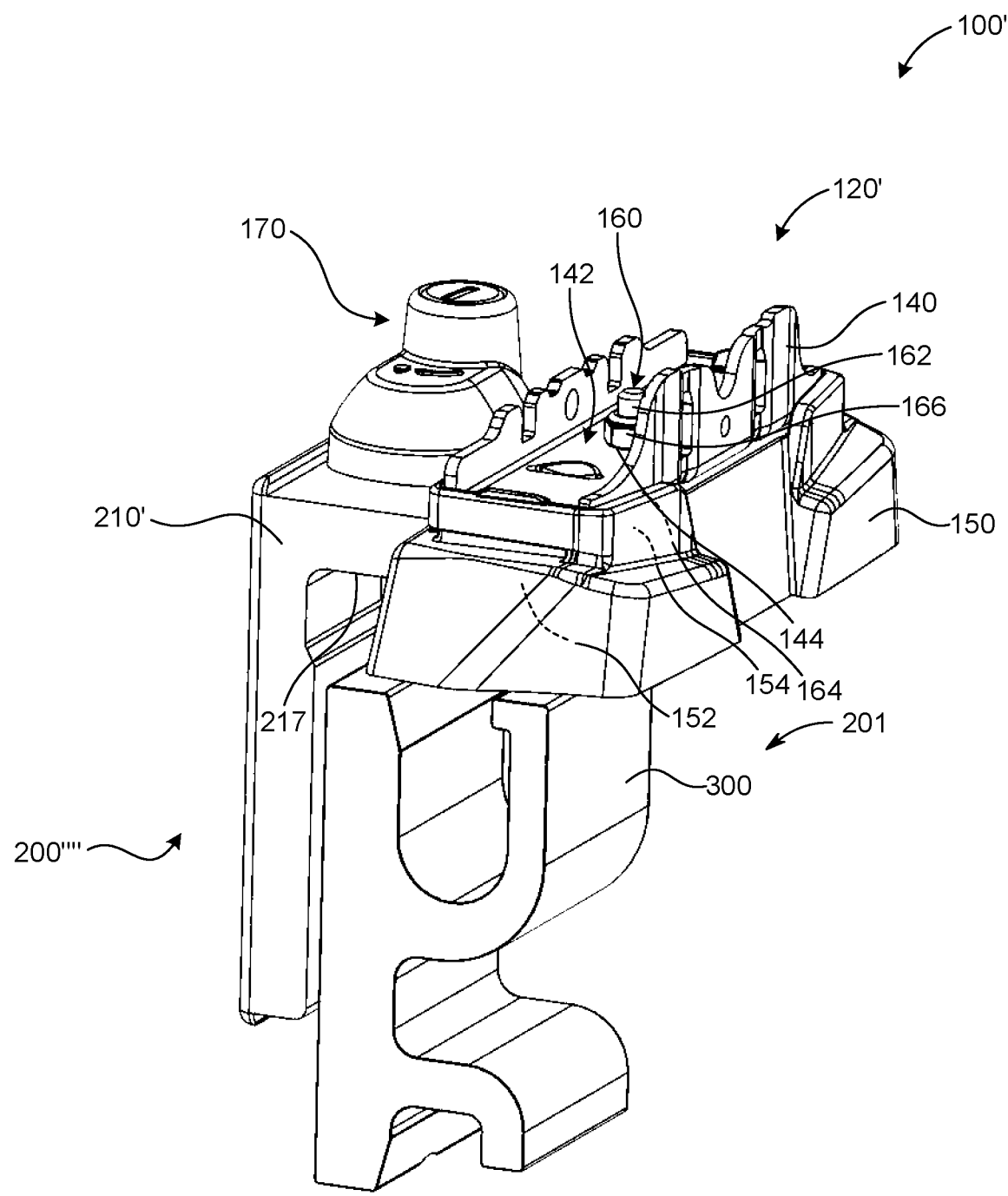
FIG. 20 illustrates a partial front perspective view of the load carrier shown in FIG. 19.

FIGS. 14-20 illustrate load carrier system 100', according to aspects. FIG. 14 illustrates a side perspective view of load carrier system 100', according to an aspect. FIG. 15 illustrates a front view of load carrier 120' of load carrier system 100' shown in FIG. 14, according to an aspect. FIG. 16 illustrates a cross-sectional view of load carrier 120' shown in FIG. 15. FIG. 17 illustrates an exploded side perspective view of load carrier 120' shown in FIG. 15. FIG. 18 illustrates a partial front perspective view of load carrier 120' shown in FIG. 15. FIG. 19 illustrates a partial front perspective view of load carrier 120' shown in FIG. 18. FIG. 20 illustrates a partial front perspective view of load carrier 120' shown in FIG. 19. Load carrier system 100' can be configured to secure load carrier 120' to vehicle bed structure 104 of vehicle 102. Load carrier 120' can be configured to connect support assembly 200''' to load carrier foot 130 and connect support assembly 200''' to vehicle bed structure 104.

FIGS. 14-20 illustrate load carrier system 100', according to certain aspects. The aspects of load carrier system 100 with load carrier 120 shown in FIG. 1, for example, and the aspects of load carrier system 100' with load carrier 120' shown in FIGS. 14-20 may be similar. Similar reference numbers are used to indicate features of the aspects of load carrier system 100 shown in FIG. 1 and the similar features of the aspects of load carrier system 100' shown in FIGS. 14-20. Load carrier system 100' can include load carrier 120' with load carrier foot 130, load carrier cradle 140, load carrier base 150, second tensioning device 160, and support assembly 200''' rather than load carrier 120 with support assembly 200 shown in FIG. 1.

Although load carrier system 100' with load carrier 120' is shown in FIGS. 14-20 as a stand-alone apparatus and/or system, the aspects of this disclosure can be used with other apparatuses and/or systems, such as, but not limited to load carrier system 100, load carrier 120, 120', second tensioning device 160, support assembly 200, 200', 200'', 200''', 200'''', first jaw member 210, tensioning device 220, second jaw member 300, split second jaw member 300', extension piece 400, lock assembly 500, and/or other various vehicles. In some aspects, load carrier system 100' with load carrier 120' can be implemented on different vehicles 102. For example, vehicle 102 can include Chevrolet® Silverado, Chevrolet® Colorado, Dodge RAM® 1500/2500/3500, Ford® F-Series, GMC® Sierra, GMC® Canyon, Jeep® Gladiator, Nissan® Frontier, Nissan® Titan, Toyota® Tacoma, Toyota® Tundra, and/or other pickup trucks.

As shown in FIG. 14, load carrier system 100' can include load carrier 120' and support assembly 200'''. In some aspects, load carrier 120' can be secured to vehicle bed structure 104 of vehicle 102 by support assembly 200'''. For example, one or more support assemblies 200'''' can be secured to interior rails 110, 111 of vehicle bed structure 104 and be secured to one or more load carrier feet 130 of load carrier 120'.

Load carrier 120' can be configured to attach to vehicle 102 (see FIG. 1) to transport various objects, for example, elongate objects (e.g., ladders, lumber, piping, canoes, kayaks, paddles, surfboards, etc.). The aspects of load carrier 120 shown in FIG. 1, for example, and the aspects of load carrier 120' shown in FIGS. 14-20 may be similar. Similar reference numbers are used to indicate features of the aspects of load carrier 120 shown in FIG. 1 and the similar features of the aspects of load carrier 120' shown in FIGS. 14-20.

As shown in FIGS. 14-17, for example, load carrier 120' can include load carrier cross bar 122, load carrier foot 130, load carrier cradle 140, load carrier base 150, support assembly 200''', tensioning device 220, second tensioning device 160, and/or lock assembly 170. In some aspects, load carrier 120' can include dual load carrier feet 130 (e.g., one carrier foot at each end of load carrier cross bar 122). For example, as shown in FIG. 16, load carrier foot 130 can be coupled to load carrier cross bar 122 and support assembly 200'''' by, for example, second tensioning device 160. In some aspects, load carrier system 100' can include one or more load carriers 120'. For example, load carrier system 100' can include dual (e.g., two) load carriers 120'.

Load carrier cross bar 122 can be configured to support one or more loads (e.g., elongate objects) and be coupled to load carrier foot 130. In some aspects, load carrier cross bar 122 can be coupled to one or more load carrier feet 130. For example, as shown in FIG. 14, load carrier cross bar 122 can be coupled to dual (e.g., two) load carrier feet 130. In some aspects, load carrier cross bar 122 can include a polymer, a plastic, a metal, a ceramic, some combination thereof, and/or any other suitably rigid material.

Load carrier cross bar 122 can include load carrier connection bar 124, connection bolt 126, and cover 128. Load carrier connection bar 124 can be configured to couple (e.g., mate) to load carrier foot 130. For example, as shown in FIG. 16, load carrier connection bar 124 can mate (e.g., in a locked configuration) to first connector 132 of load carrier foot 130. Load carrier connection bar 124 can be disposed within load carrier cross bar 122 and be secured to load carrier cross bar 122 by connection bolt 126. For example, as shown in FIGS. 16 and 17, connection bolt 126 can couple (e.g., secure) load carrier connection bar 124 to load carrier cross bar 122. In some aspects, cover 128 can be coupled to one or more distal ends of load carrier cross bar 122. For example, as shown in FIGS. 14 and 17, cover 128 can be disposed at a distal end of load carrier cross bar 122.

Load carrier foot 130 can be configured to secure load carrier cross bar 122. In some aspects, load carrier foot 130 can include a polymer, a plastic, a metal, a ceramic, some combination thereof, and/or any other suitably rigid material. As shown in FIGS. 16 and 17, for example, load carrier foot 130 can include first connector 132, second connector 134, and/or locking mechanism 136. First connector 132 can be configured to couple (e.g., secure) to load carrier connection bar 124. Second connector 134 can be configured to couple (e.g., secure) to load carrier cross bar 122. Locking mechanism 136 can be configured to actuate first connector 132 and/or second connector 134 and lock (secure) load carrier foot 130 to load carrier cross bar 122. In some aspects, as shown in FIG. 19, locking mechanism 136 can include cam 137 or other mechanical linkage to adjust first connector 132, for example, a vertical height of first connector 132. In some aspects, load carrier foot 130 can be disposed between load carrier cross bar 122 and load carrier cradle 140. For example, as shown in FIGS. 15 and 16, load carrier cross bar 122, load carrier foot 130, and load carrier cradle 140 can be stacked vertically, for example, in a locked configuration.

Load carrier cradle 140 can be configured to secure load carrier foot 130 to load carrier base 150 and support assembly 200'''. In some aspects, load carrier cradle 140 can include a polymer, a plastic, a metal, a ceramic, some combination thereof, and/or any other suitably rigid material. As shown in FIGS. 16, 17, and 20, load carrier cradle 140 can include recess 142 and aperture 144. Recess 142 can be configured to receive load carrier foot 130. In some aspects, as shown in FIGS. 16 and 20, recess 142 can include a U-shape to mate with bottom end 135 of load carrier foot 130. Aperture 144 can be configured to receive second tensioning device 160. In some aspects, load carrier cradle 140 can be disposed between load carrier foot 130 and load carrier base 150. For example, as shown in FIGS. 15 and 18, load carrier foot 130, load carrier cradle 140, and load carrier base 150 can be stacked vertically, for example, in a locked configuration.

Load carrier base 150 can be configured to secure load carrier cradle 140 to support assembly 200'''. In some aspects, load carrier base 150 can include a polymer, a plastic, a metal, a ceramic, some combination thereof, and/or any other suitably rigid material. As shown in FIGS. 16, 17, and 20, for example, load carrier base 150 can include recess 152 and aperture 154. Recess 152 can be configured to receive support assembly 200'''. For example, as shown in FIG. 16, recess 152 can receive frontside 216 of flat padded first jaw member 210' and second tensioning device 160. Aperture 154 can be configured to receive second tensioning device 160. For example, as shown in FIG. 20, second tensioning device 160 can extend through aperture 154 to secure load carrier cradle 140, load carrier base 150, and clamp assembly 201 of support assembly 200'''' to each other. In some aspects, load carrier base 150 can be disposed between load carrier cradle 140 and clamp assembly 201 of support assembly 200'''. For example, as shown in FIGS. 15 and 18, load carrier cradle 140, load carrier base 150, and clamp assembly 201 of support assembly 200'''' can be stacked vertically, for example, in a locked configuration.

Second tensioning device 160 can be coupled to clamp assembly 201 of support assembly 200''' and be configured to secure load carrier foot 130 to clamp assembly 201. In some aspects, second tensioning device 160 can include a polymer, a plastic, a metal, a ceramic, some combination thereof, and/or any other suitably rigid material. For example, second tensioning device 160 can include steel, iron, aluminum, nickel, etc.

As shown in FIGS. 16 and 17, for example, second tensioning device 160 can include bolt 162, washer 164, and/or nut 166. In some aspects, second tensioning device 160 can include a bolt, screw, anchor, rivet, stud, washer, nut, pin, lock pin, key, insert, retaining ring, and/or any other type of removable fastener. In some aspects, bolt 162 can be a threaded bolt (e.g., M10 threads). In some aspects, bolt 162 (e.g., threaded) can extend through flat padded first jaw member 210' (e.g., via second through hole 215'), load carrier base 150 (e.g., via aperture 154), and load carrier cradle 140 (e.g., via aperture 144). For example, as shown in FIGS. 17 and 20, bolt 162 can extend through second through hole 215', washer 164, aperture 154, aperture 144 and connect to nut 166 to secure flat padded first jaw member 210', load carrier base 150, and load carrier cradle 140 to each other in a locked configuration. In some aspects, engagement (e.g., tightening) of second tensioning device 160 can be from underside 217 of support assembly 200''' for ease of user access. For example, as shown in FIG. 16, a distal end of bolt 162 (e.g., hex head socket cap) can be positioned at pad aperture 213' on underside 217 of flat padded first jaw member 210'.

In some aspects, as shown in FIGS. 14 and 17, for example, load carrier 120' can include lock assembly 170 configured to provide additional security and protection to load carrier 120'. Lock assembly 170 can include actuator 172 (e.g., key cylinder) and cover 174. In some aspects, actuator 172 can include a key cylinder to lock and unlock cover 174 secured to flat padded first jaw member 210' and disposed over tensioning device 220. For example, as shown in FIGS. 17-20, cover 174 can be disposed over a distal end of tensioning device 220 (e.g., bolt 222) and secured to frontside 216 of flat padded first jaw member 210'. In some aspects, lock assembly 170 can be similar to lock assembly 500.

Example Support Assembly with Flat Padded Jaw Member

Figure 21:
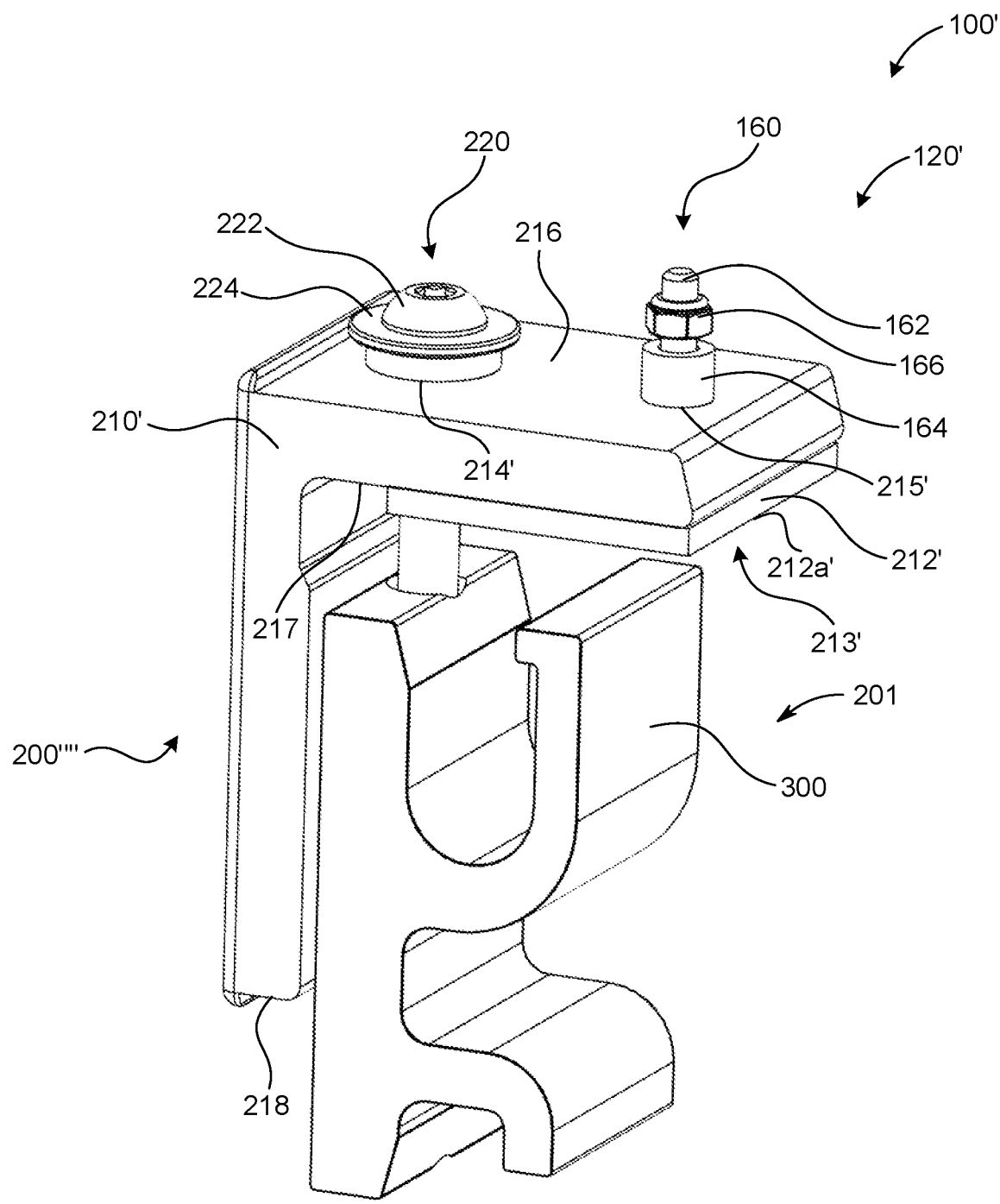
FIG. 21 illustrates a front perspective view of a support assembly of the load carrier system shown in FIG. 14, according to an aspect.
Figure 22:
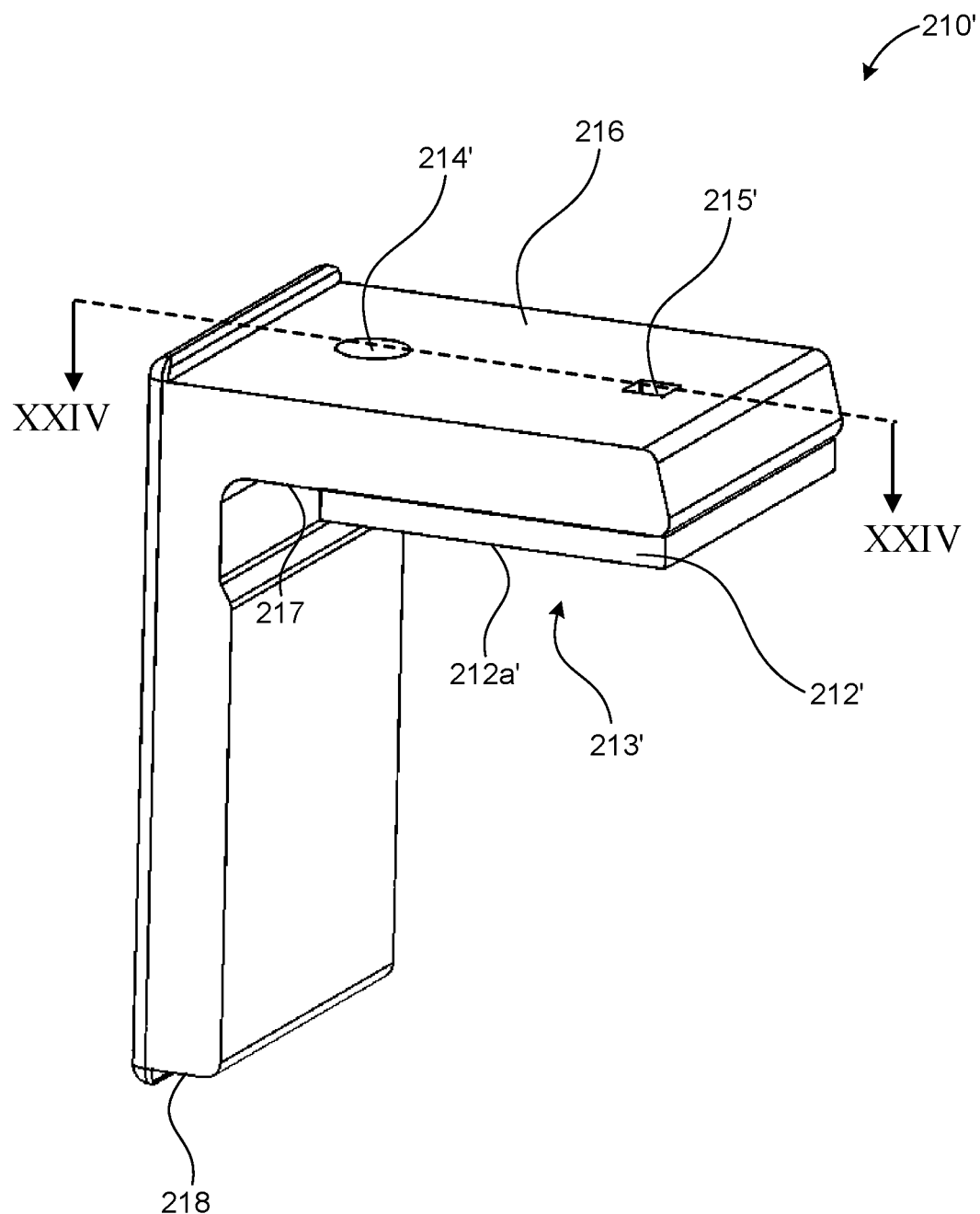
FIG. 22 illustrates a front perspective view of a jaw member of the support assembly shown in FIG. 21, according to an aspect.
Figure 23:
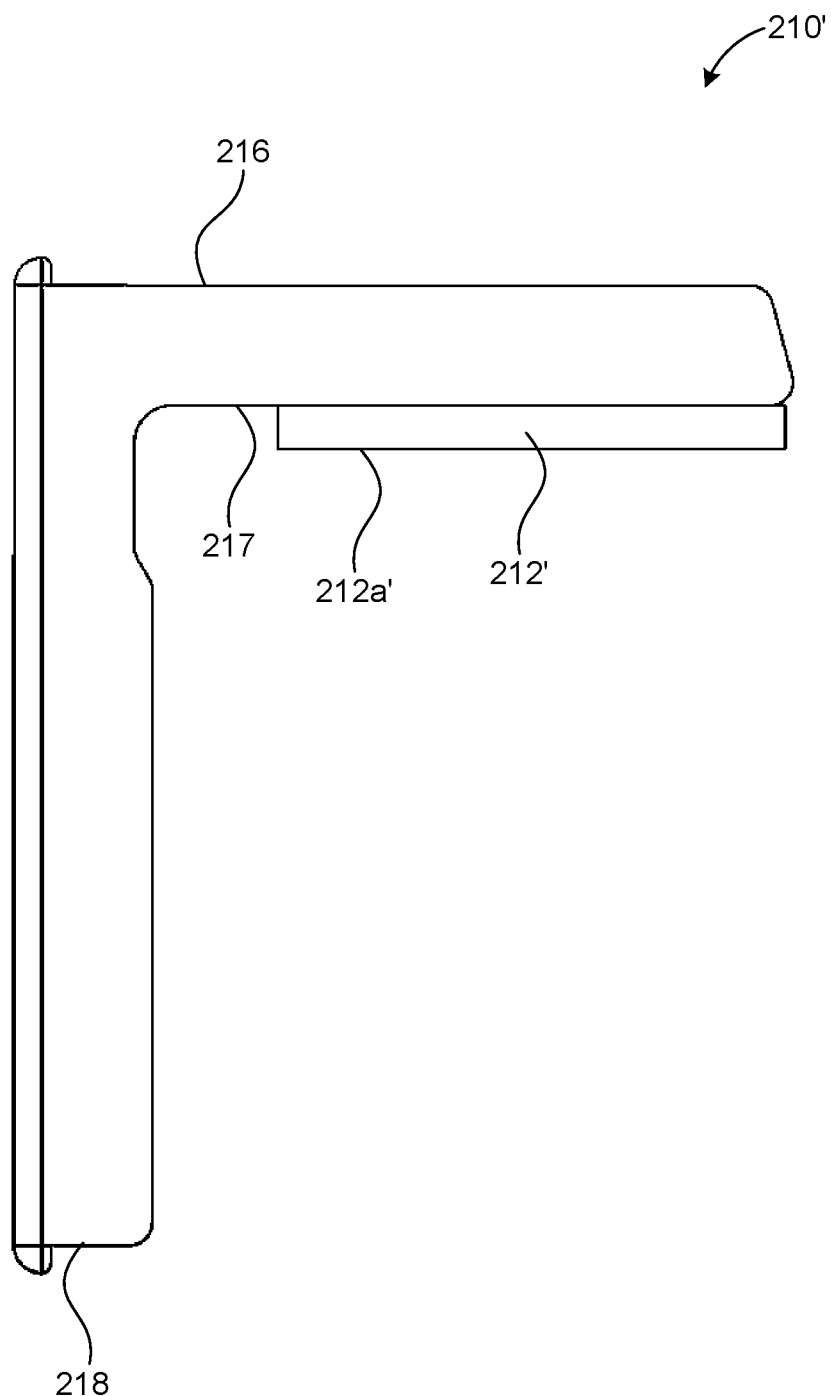
FIG. 23 illustrates a side view of the jaw member shown in FIG. 22.
Figure 24:
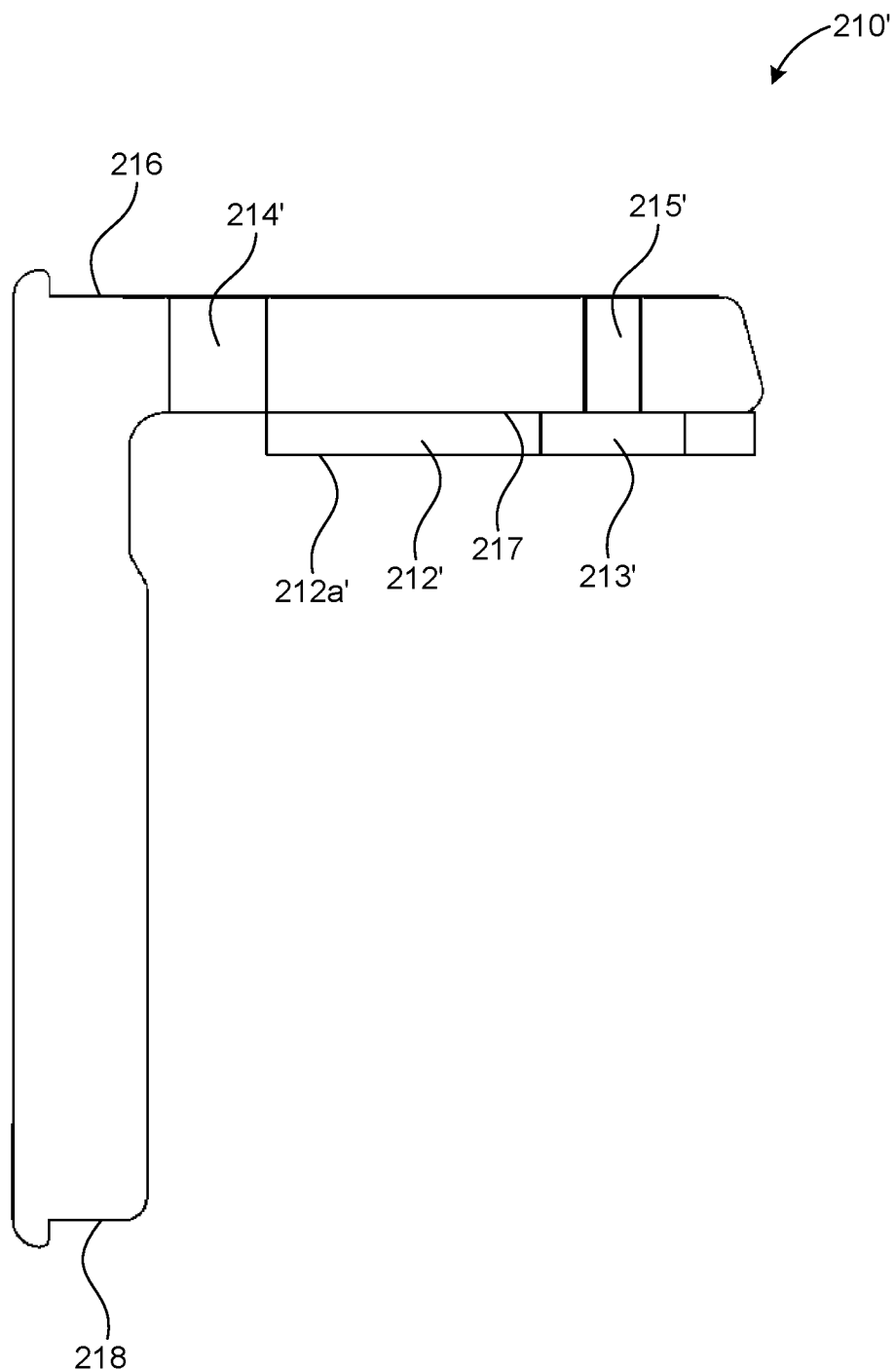
FIG. 24 illustrates a cross-sectional view of the jaw member shown in FIG. 23.

FIGS. 21-24 illustrate support assembly 200''', according to aspects. FIG. 21 illustrates a front perspective view of support assembly 200'''' of load carrier system 100' shown in FIG. 14, according to an aspect. FIG. 22 illustrates a front perspective view of flat padded jaw member 210' of support assembly 200''' shown in FIG. 21, according to an aspect. FIG. 23 illustrates a side view of flat padded jaw member 210' shown in FIG. 22. FIG. 24 illustrates a cross-sectional view of flat padded jaw member 210' shown in FIG. 23. Support assembly 200''' can be configured to connect to load carrier foot 130 and connect to a bed structure of a vehicle (e.g., vehicle bed structure 104 shown in FIG. 1). Support assembly 200''' can further be configured to have flat padded jaw member 210' with pad 212' to protect the vehicle from damage.

FIGS. 21-24 illustrate support assembly 200''', according to certain aspects. The aspects of support assembly 200 shown in FIGS. 2-5, for example, and the aspects of support assembly 200'''' shown in FIGS. 21-24 may be similar. Similar reference numbers are used to indicate features of the aspects of support assembly 200 shown in FIGS. 2-5 and the similar features of the aspects of support assembly 200''' shown in FIGS. 21-24. Support assembly 200''' can include flat padded first jaw member 210' with pad 212' having flat exterior surface 212a' and second through hole 215' for second tensioning device 160 to connect to load carrier foot 130 rather than first jaw member 210 shown in FIGS. 2-5.

Although support assembly 200''' is shown in FIGS. 21-24 as a stand-alone apparatus and/or system, the aspects of this disclosure can be used with other apparatuses and/or systems, such as, but not limited to load carrier system 100, 100', load carrier 120, 120', second tensioning device 160, support assembly 200, 200', 200'', 200''', first jaw member 210, tensioning device 220, second jaw member 300, split second jaw member 300', extension piece 400, lock assembly 500, and/or other various vehicles. In some aspects, support assembly 200''' can be part of load carrier system 100, 100'. In some aspects, support assembly 200''' can be implemented on different vehicles 102. For example, vehicle 102 can include Chevrolet® Silverado, Chevrolet® Colorado, Dodge RAM® 1500/2500/3500, Ford® F-Series, GMC® Sierra, GMC® Canyon, Jeep® Gladiator, Nissan® Frontier, Nissan® Titan, Toyota® Tacoma, Toyota® Tundra, and/or other pickup trucks.

As shown in FIGS. 21-24, for example, support assembly 200''' can include flat padded first jaw member 210'. Flat padded jaw member 210' can be configured to connect to a bed structure of a vehicle (e.g., vehicle bed structure 104 shown in FIG. 1) and protect the vehicle from damage. Flat padded first jaw member 210' can include pad 212', first through hole 214', and second through hole 215'. First through hole 214' can be configured to receive tensioning device 220 to connect flat padded first jaw member 210' to second jaw member 300. Second through hole 215' can be configured to receive second tensioning device 160 to connect flat padded first jaw member 210' to load carrier base 150 and load carrier cradle 140. Pad 212' can include flat exterior surface 212a' and pad aperture 213'. Flat exterior surface 212a' can be configured to evenly contact a bed structure of a vehicle (e.g., vehicle bed structure 104 shown in FIG. 1). Pad aperture 213' can be configured to receive second tensioning device 160 to connect support assembly 200''' to load carrier foot 130.

In some aspects, pad 212' can include a polymer, elastic material, elastomer, rubber, silicone, plastic, thermoplastic, thermoplastic elastomer (TPE), thermoplastic polyurethane (TPU), and/or any other material with a high abrasion and scratch resistance. For example, pad 212' can include TPE. For example, pad 212' can include TPU. In some aspects, pad 212' can have flat exterior surface 212a' that is substantially flat. For example, as shown in FIG. 23, flat exterior surface 212a' can be substantially flat and parallel to a transverse axis of flat padded first jaw member 210'. In some aspects, flat padded first jaw member 210' can include an L-shape. For example, as shown in FIG. 23, flat padded first jaw member 210' has an L-shape in a side view.

It is to be appreciated that the Detailed Description section, and not the Brief Summary and Abstract sections, is intended to be used to interpret the claims. The Summary and Abstract sections may set forth one or more but not all aspects of the support assembly system and apparatus, and thus, are not intended to limit the present aspects and the appended claims.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the disclosure that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

What is claimed is:

1. A support assembly for securing a load carrier to a bed structure of a vehicle, the support assembly comprising:
    a clamp assembly for clamping the load carrier to the bed structure of the vehicle, the clamp assembly comprising:
        a first jaw member; and
        a second jaw member opposite the first jaw member, the second jaw member comprising:
            a first hook member having a first concave portion facing towards the first jaw member;
            a second hook member opposite the first hook member and having a second concave portion facing away from the first jaw member; and
            a gap disposed between a bottom surface of the first hook member and an upper surface of the second hook member,
        wherein the clamp assembly is attachable to a plurality of different vehicle bed structures; and
    a tensioning device coupled to the clamp assembly and configured to tighten the clamp assembly.

2. The support assembly of claim 1, wherein the second jaw member is monolithic.

3. The support assembly of claim 1, wherein the first and second hook members are interchangeably connected to the tensioning device such that the first hook member can be disposed between the first jaw member and the second hook member in a first configuration, and the second hook member can be disposed between the first jaw member and the first hook member in a second configuration.

4. The support assembly of claim 1, wherein the first concave portion comprises a U-shape.

5. The support assembly of claim 1, wherein the first hook member comprises:
    a first hook leg configured to couple to the tensioning device; and
    a second hook leg spaced laterally from the first hook leg and configured to couple to the bed structure of the vehicle in a locked configuration.

6. The support assembly of claim 1, wherein the first hook member comprises a bevel configured to accommodate the plurality of different vehicle bed structures and to decrease a distance between the second jaw member and the bed structure in a locked configuration.

7. The support assembly of claim 1, wherein the second concave portion comprises a U-shape.

8. The support assembly of claim 1, wherein the second hook member comprises:
    a first hook leg configured to couple to the tensioning device; and
    a second hook leg spaced laterally from the first hook leg and configured to couple to the bed structure of the vehicle in a locked configuration.

9. The support assembly of claim 1, wherein the second hook member comprises a bevel configured to accommodate the plurality of different vehicle bed structures and to decrease a distance between the second jaw member and the bed structure in a locked configuration.

10. The support assembly of claim 1, wherein the first and second hook members are separated from each other along a transverse edge.

11. A jaw member for a clamp assembly for clamping a load carrier to a bed structure of a vehicle, the jaw member comprising:
- a first hook member having a u-shape orientated toward a first direction;
- a second hook member having a u-shape orientated toward a second direction opposite the first direction; and
- a gap disposed between a lower surface of the first hook member and an upper surface of the second hook member in the first direction, wherein the gap is at least 19.5 mm,
- wherein the jaw member is attachable to a plurality of different vehicle bed structures.

12. The jaw member of claim 11, wherein the first and second hook members are interchangeable with one another such that the first hook member can be disposed above the second hook member in a first configuration, and the second hook member can be disposed above the first hook member in a second configuration.

13. The jaw member of claim 11, wherein the first hook member comprises:
- a first hook leg comprising a through hole for a tensioning device; and
- a second hook leg spaced laterally from the first hook leg and configured to couple to the bed structure of the vehicle in a locked configuration.

14. The jaw member of claim 13, wherein the second hook leg comprises a distal contact surface having a surface area of at least 270 mm² to distribute a force between the first hook member and the bed structure along the distal contact surface in the locked configuration.

15. The jaw member of claim 13, wherein the first and second hook legs are spaced laterally from each other by an interior distance of 19 mm.

16. The jaw member of claim 11, wherein the first hook member comprises a bevel at an angle of at least 13 degrees.

17. The jaw member of claim 13, wherein the second hook member comprises:
- a first hook leg comprising a through hole for a tensioning device; and
- a second hook leg spaced laterally from the first hook leg and configured to couple to the bed structure of the vehicle in the locked configuration.

18. The jaw member of claim 17, wherein the second hook leg comprises a distal contact surface having a surface area of at least 360 mm² to distribute a force between the second hook member and the bed structure along the distal contact surface in the locked configuration.

19. The jaw member of claim 11, wherein a length of the second hook member along a longitudinal axis of the jaw member is greater than a length of the first hook member along the longitudinal axis.

20. A system for securing a load carrier to a bed structure of a vehicle, the system comprising:
- a load carrier foot; and
- a support assembly coupled to the load carrier foot, the support assembly comprising:
  - a clamp assembly for clamping the load carrier to the bed structure of the vehicle, the clamp assembly comprising:
    - a first jaw member; and
    - a second jaw member opposite the first jaw member, the second jaw member comprising:
      - a first hook member having a first concave portion facing towards the first jaw member,
      - a second hook member opposite the first hook member and having a second concave portion facing away from the first jaw member, and
      - a gap disposed between a bottom surface of the first hook member and an upper surface of the second hook member sized to receive a vehicle bed structure,
    - wherein the clamp assembly is attachable to a vehicle bed structure with the second jaw member in a first orientation and attachable to a different vehicle bed structure with the second jaw member in a second orientation, and
    - wherein the first orientation of the second jaw member is vertically inverted from the second orientation of the second jaw member;
  - a first tensioning device coupled to the clamp assembly and configured to tighten the clamp assembly; and
  - a second tensioning device coupled to the clamp assembly and configured to secure the load carrier foot to the clamp assembly.

21. The system of claim 20, wherein the first jaw member comprises a pad configured to contact the bed structure of the vehicle.

22. The system of claim 21, wherein the pad comprises a thermoplastic elastomer (TPE).

23. The system of claim 21, wherein the pad comprises an exterior surface that is substantially flat.

24. The system of claim 21, wherein the pad comprises an aperture for the second tensioning device.

25. The system of claim 20, wherein the first jaw member comprises an L-shape.

26. The system of claim 20, wherein the first jaw member comprises an aperture for the second tensioning device.

27. The system of claim 20, wherein the second jaw member is formed as a single piece.

* * * * *